US006449739B1

United States Patent
Landan

(12) United States Patent
(10) Patent No.: US 6,449,739 B1
(45) Date of Patent: Sep. 10, 2002

(54) POST-DEPLOYMENT MONITORING OF SERVER PERFORMANCE

(75) Inventor: Amnon Landan, Los Altos, CA (US)

(73) Assignee: Mercury Interactive Corporation, Sunnyvale, CA (US)

( * ) Notice: Subject to any disclaimer, the term of this patent is extended or adjusted under 35 U.S.C. 154(b) by 0 days.

(21) Appl. No.: 09/484,686

(22) Filed: Jan. 17, 2000

Related U.S. Application Data
(60) Provisional application No. 60/151,824, filed on Sep. 1, 1999.

(51) Int. Cl.[7] ................................................. H02H 3/05

(52) U.S. Cl. ........................... 714/47; 709/224; 713/201

(58) Field of Search .............................. 714/47, 25, 27; 713/201; 709/203, 223; 707/10; 711/114, 101; 705/35; 345/733; 370/252

(56) References Cited

U.S. PATENT DOCUMENTS

| | | | |
|---|---|---|---|
| 5,684,945 A | | 11/1997 | Chen et al. |
| 5,732,218 A | * | 3/1998 | Bland et al. ................. 709/224 |
| 5,781,703 A | | 7/1998 | Desai et al. |
| 5,787,254 A | | 7/1998 | Maddalozzo, Jr. et al. |
| 5,812,780 A | | 9/1998 | Chen et al. |
| 5,819,066 A | | 10/1998 | Bromberg et al. |
| 5,864,659 A | * | 1/1999 | Kini ....................... 395/183.07 |
| 5,870,559 A | | 2/1999 | Leshem et al. |

(List continued on next page.)

OTHER PUBLICATIONS

Mainkar, V., "Availability Analysis of Transaction Processing Systems based on User–Perceived Performance," Proc. Sixteeth Symp. On Reliable Distributed Systems, pp. 10–17, dated Oct. 1997.

International Preliminary Examination Report for PCT/US00/24303 (4 pages).

(List continued on next page.)

Primary Examiner—Scott Baderman
Assistant Examiner—Rita A Ziemer
(74) Attorney, Agent, or Firm—Knobbe, Martens, Olson & Bear LLP

(57) ABSTRACT

A monitoring system allows users to monitor the post-deployment performance of a web-based or other transactional server. The system includes an agent component ("agent") which can be installed on computers ("agent computers") that have access to the transactional server, including computers of actual users of the transactional server. The agent simulates the actions of actual users of the transactional server while monitoring the server's performance. The specific transactions to be performed by the agent computers are specified by testcases that are dispatched to the agent computers using a controller component ("controller"). As each agent computer executes a testcase, it reports the execution results (performance data) in real-time to a web-based reports server which stores the results in a centralized database. The performance data may include, for example, server response times, screen display sequences for failed transactions, measured segment delays along network paths, and identifiers of "broken" web site links. Authorized personnel can access the reports server using a standard web browser to view the collected performance data via a series of customizable reports. Using the controller, the user can also assign testcase execution schedules to the agent computers, including periodic schedules that provide for continuous or near-continuous monitoring of the transactional server. In addition, the user can specify alert conditions which cause personnel to be immediately notified (e.g., by pager) of problems. The controller and the reports server also provide functions for allowing the user to monitor the operation of the transactional server according to the attributes of the agent computers, such as the locations, organizations, and ISPs of such computers.

47 Claims, 20 Drawing Sheets

U.S. PATENT DOCUMENTS

| | | | |
|---|---|---|---|
| 5,905,868 A | | 5/1999 | Baghai et al. |
| 5,918,004 A | | 6/1999 | Anderson et al. |
| 5,938,729 A | | 8/1999 | Cote et al. |
| 5,958,010 A | * | 9/1999 | Agarwal et al. ............ 709/224 |
| 6,006,260 A | | 12/1999 | Barrick, Jr. et al. |
| 6,138,157 A | | 10/2000 | Welter et al. |
| 6,154,731 A | * | 11/2000 | Monks et al. ................. 705/35 |
| 6,205,413 B1 | | 3/2001 | Bisdikian et al. |
| 6,324,492 B1 | * | 11/2001 | Rowe .......................... 703/13 |

OTHER PUBLICATIONS

"Method for Performing Automated Pseudo Video Recording of Remote Computer Systems," IBM Technical Disclosure Bulletin, US, IBM Corp. New York, vol. 37, No. 4A, p. 495, Apr. 1, 1994.

International Search Report for PCT/US00/24303 (4 pages).

Randall, N., "Web Site Analysis Tools: The Results Are In," PC Magazine, Mar. 10, 1998, pp. 188–210.

Dalton, G., "Online Measurement—Keynote's service lets companies see what customers see," Information Week Online, May 10, 1999 (2 pages printed from InformationWeek.com Web Site).

Killeelea, P., "Web Performance Measuring Tools and Services," Webreview.com, Jan. 15, 1999 (5 pages printed from Webreview.com web site).

Selected pages printed from Keynote.com Web Site on Aug. 27, 1999 (32 pages).

LoadRunner Controller User's Guide–Windows Version 5.01, Mercury Interactive Corporation (bound printout of online guide, 393 pages, undated).

Astra QuickTest version 1.0 User's Guide, Mercury Interactive Corporation (bound print–out of online guide).

* cited by examiner

POST-DEPLOYMENT MONITORING OF SERVER PERFORMANCE

RELATED APPLICATIONS

This application claims priority to U.S. Provisional Appl. No. 60/151,824, filed Sep. 1, 1999.

FIELD OF THE INVENTION

The present invention relates to software tools for testing and monitoring the operation of web-based and other transactional servers.

BACKGROUND OF THE INVENTION

A variety of commercially-available software tools exist for assisting companies in testing the performance and functionality of their web-based transactional servers and associated applications prior to deployment. Examples of such tools include the LoadRunner®, WinRunner® and Astra QuickTest® products of Mercury Interactive Corporation, the assignee of the present application.

Using these products, a user can record or otherwise create a test script which specifies a sequence of user interactions with the transactional server. The user may also optionally specify certain expected responses from the transactional server, which may be added to the test script as verification points. For example, the user may record a session with a web-based travel reservation system during which the user searches for a particular flight, and may then define one or more verification points to check for an expected flight number, departure time or ticket price.

Test scripts generated through this process are "played" or "executed" to simulate the actions of users—typically prior to deployment of the component being tested. During this process, the testing tool monitors the performance of the transactional server, including determining the pass/fail status of any verification points. Multiple test scripts may be replayed concurrently to simulate the load of a large number of users. Using an automation interface of the LoadRunner product, it is possible to dispatch test scripts to remote computers for execution.

The results of the test are typically communicated to the user through a series of reports that are accessible through the user interface of the testing tool. The reports may contain, for example, graphs or charts of the observed response times for various types of transactions. Performance problems discovered through the testing process may be corrected by programmers or system administrators.

A variety of tools and services also exist that allow web site operators to monitor the post-deployment performance of their web sites. For example, Keynote Systems Inc. of San Mateo, Calif. provides a service which uses automated agents to access a web site at regular intervals throughout the day. The agents computers, which are provided by Keynote Systems in selected major cities, measure the time required to perform various web site functions, and report the results to a server provided by Keynote Systems. The owner or operator of the web site can access this server using a web browser to view the collected performance data on a city-by-city or other basis. Other types of existing monitoring tools include log analysis tools that process access logs generated by web servers, and packet sniffing tools that monitor traffic to and from the web server.

SUMMARY OF THE INVENTION

A significant problem with existing monitoring tools and services is that they often fail to detect problems that are dependent upon the attributes of typical end users, such as the user's location, PC configuration, ISP (Internet Service Provider), or Internet router. For example, with some web site monitoring services, the web site operator can monitor the web site only from the agent computers and locations made available by the service provider; as a result, the service may not detect a performance problem seen by the most frequent users of the system (e.g., members of a customer service department who access the web site through a particular ISP, or who use a particular PC configuration).

Even when such attribute-specific problems are detected, existing tools and services often fail to identify the specific attributes that give rise to the problem. For example, a monitoring service may indicate that web site users in a particular city are experiencing long delays, but may fail to reveal that the problem is experienced only by users that access the site through a particular router. Without such additional information, system administrators may not be able to isolate and correct such problems.

Another significant problem with existing tools and services is that they do not provide an adequate mechanism for monitoring the current status of the transactional server, and for promptly notifying system administrators when a problem occurs. For example, existing tools and services typically do not report a problem until many minutes or hours after the problem has occurred. As a result, many end users may experience the problem before a system administrator becomes aware of the problem.

The present invention addresses these and other problems by providing a software system and method for monitoring the post-deployment operation of a web site system or other transactional server. In a preferred embodiment, the system includes an agent component ("agent") which simulates the actions of actual users of the transactional server while monitoring and reporting the server's performance. In accordance with one aspect of the invention, the agent is adapted to be installed on selected computers ("agent computers") to be used for monitoring, including computers of actual end users. For example, the agent could be installed on selected end-user computers within the various offices or organizations from which the transactional server is commonly accessed. Once the agent component has been installed, the agent computers can be remotely programmed (typically by the operator of the transactional server) using a controller component ("controller"). The ability to flexibly select the computers to be used for monitoring purposes, and to use actual end-user computers for monitoring, greatly facilitates the task of detecting problems associated with the attributes of typical end users.

In accordance with another aspect of the invention, the controller provides a user interface and various functions for a user to remotely select the agent computer(s) to include in a monitoring session, assign attributes to such computers (such as the location, organization, ISP and/or configuration of each computer), and assign transactions and execution schedules to such computers. The execution schedules may be periodic or repetitive schedules, (e.g., every hour, Monday through Friday), so that the transactional server is monitored on a continuous or near-continuous basis. The controller preferably represents the monitoring session on the display screen as an expandable tree in which the transactions and execution schedules are represented as children of the corresponding computers. Once a monitoring session has been defined, the controller dispatches the transactions and execution schedules to the respective agent computers over the Internet or other network. The controller also preferably includes functions for the user to record and edit transactions, and to define alert conditions for generating real-time alert notifications. The controller may optionally be implemented as a hosted application on an Internet or intranet site, in which case users may be able to remotely set up monitoring sessions using an ordinary web browser.

During the monitoring session, each agent computer executes its assigned transactions according to its assigned execution schedule, and generates performance data that indicates one or more characteristics of the transactional server's performance. The performance data may include, for example, the server response time and pass/fail status of each transaction execution event. The pass/fail status values may be based on verification points (expected server responses) that are defined within the transactions. The agent computers preferably report the performance data associated with a transaction immediately after transaction execution, so that the performance data is available substantially in real-time for viewing and generation of alert notifications. In the preferred embodiment, the performance data generated by the various agent computers is aggregated in a centralized database which is remotely accessible through a web-based reports server. The reports server provides various user-configurable charts and graphs that allow the operator of the transactional server to view the performance data associated with each transaction.

In accordance with another aspect of the invention, the reports server generates reports which indicate the performance of the transactional server separately for the various operator-specified attributes. Using this feature, the user can, for example, view and compare the performance of the transactional server as seen from different operator-specified locations (e.g., New York, San Francisco, and U.K.), organizations (e.g., accounting, marketing, and customer service departments), ISPs (e.g., Spring, AOL and Earthlink), or other attribute type. The user may also have the option to filter out data associated with particular attributes and/or transactions (e.g., exclude data associated with AOL customers), and to define new attribute types (e.g., modem speed or operating system) for partitioning the performance data. The ability to monitor the performance data according to the operator-specified attributes greatly facilitates the task of isolating and correcting attribute-dependant performance problems.

In accordance with another aspect of the invention, the performance data is monitored substantially in real-time (preferably by the controller) to check for any user-defined alert conditions. When such an alert condition is detected, a notification message may be sent by email, pager, or other communications method to an appropriate person. The alert conditions may optionally be specific to a particular location, organization, ISP, or other attribute. For example, a system administrator responsible for an Atlanta branch office may request to be notified when a particular problem (e.g., average response time exceeds a particular threshold) is detected by computers in that office. In the preferred embodiment, upon receiving an alert notification, the administrator can use a standard web browser to access the reports server and view the details of the event or events that triggered the notification.

In accordance with another aspect of the invention, the agent computers may be programmed to capture sequences of screen displays during transaction execution, and to transmit these screen displays to the reports server for viewing when a transaction fails. This feature allows the user to view the sequence of events, as "seen" by an agent, that led to the error condition.

In accordance with another feature of the invention, an agent computer may be programmed to launch a network monitor component when the path delay between the agent computer and the transactional server exceeds a preprogrammed threshold. Upon being launched, the network monitor component determines the delays currently being experienced along each segment of the network path. The measured segment delays are reported to personnel (preferably through the reports server), and may be used to detect various types of network problems. In accordance with another aspect of the invention, one or more of the agent computers may be remotely programmed to scan or crawl the monitored web site periodically to check for broken links (links to inaccessible objects). When broken links are detected, they may be reported by email, through the reports server, or by other means.

BRIEF DESCRIPTION OF THE DRAWINGS

A distributed monitoring tool and associated methods that embody the various inventive features will now be described with reference to the following drawings.

DETAILED DESCRIPTION OF THE PREFERRED EMBODIMENT

The following description sets forth numerous implementation-specific details of a distributed monitoring tool and associated methods. These details are provided in order to illustrate a preferred embodiment of the invention, and not to limit the scope of the invention. The scope of the invention is defined only by the appended claims.

Throughout this description, it will be assumed that the transactional server being monitored is a web-based system that is accessible via the Internet. It will be recognized, however, that the inventive methods can also be used to monitor other types of transactional servers, including those that use proprietary protocols or are accessible only to internal users of a particular organization. For example, the underlying methodology can also be used to monitor internal intranets, two-tier client/server systems, SAP R/3 systems, and other types of distributed systems.

I. Overview

Figure 1:
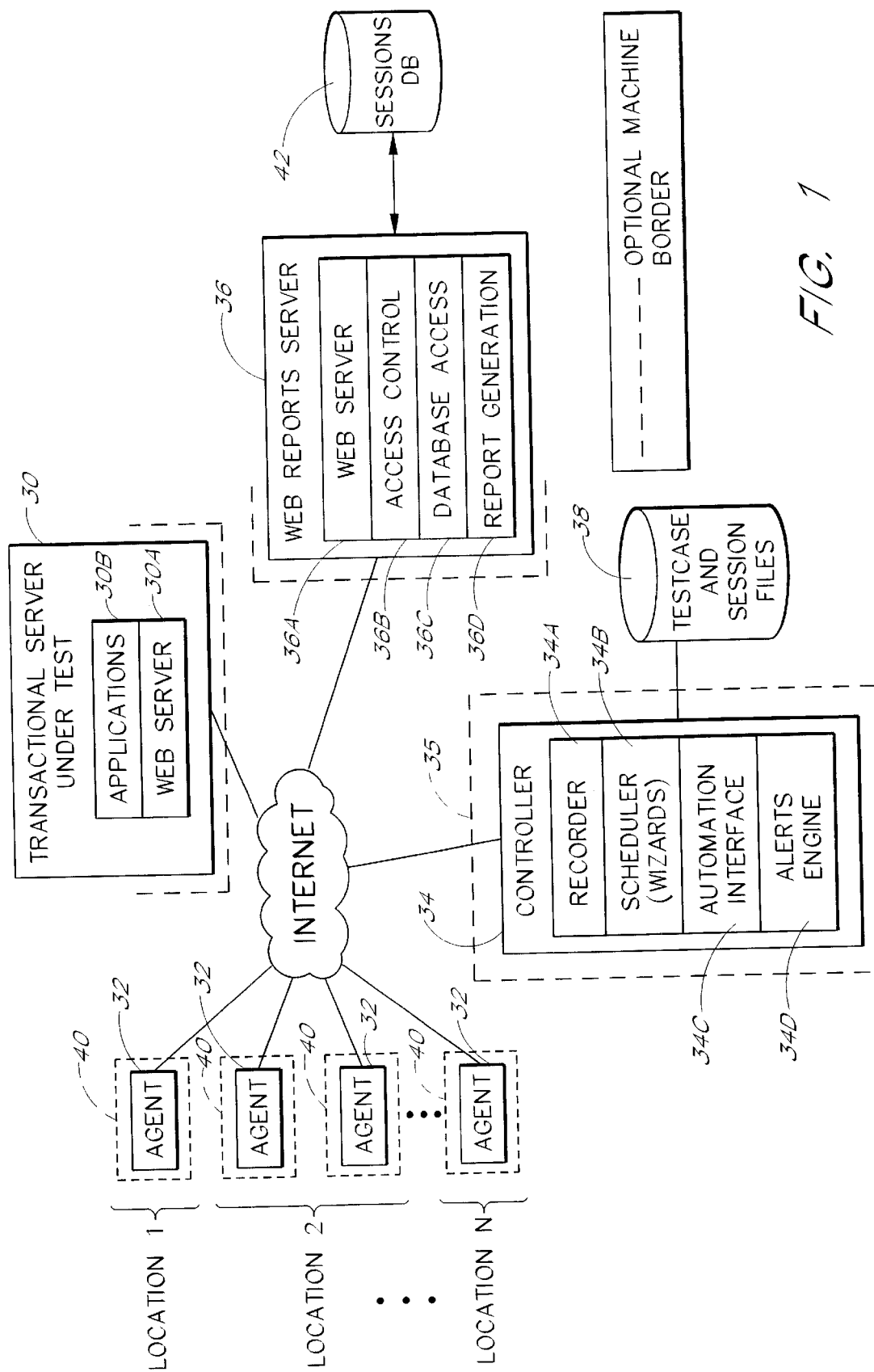
FIG. 1 illustrates the general architecture of the monitoring tool, and illustrates how the monitoring tool may be used to monitor the performance of a web-based transactional server.

FIG. 1 illustrates the general components of the distributed monitoring tool, and illustrates how these components may be deployed within a network to test and monitor a web-based transactional server 30. Dashed lines in FIG. 1 indicate typical machine boundaries, with open boxes indicating one or more machines. As depicted by FIG. 1, the transactional server 30 typically includes a web server component 30A and one or more applications 30B. The applications may, for example, provide functionality for implementing one or more business processes, such as setting up a user account or placing an order. The applications 30B typically provide user access to one or more back-end databases (not shown). The transactional server may include multiple machines, including machines that are geographically remote from one another.

As further depicted by FIG. 1, the monitoring tool consists of three primary software components: an agent 32, a controller 34 and a web-based reports server 36. Each component 32, 34, 36 includes one or more executable files or modules stored within a computer-readable medium.

The agent 32 includes the basic functionality for simulating the actions of users of the transactional server 30 while monitoring and reporting server performance. As illustrated in FIG. 1, the agent 32 is preferably installed on multiple Internet-connected host computers 40 (PCs, workstations, etc.) so that the end user experience can be captured from multiple locations. These host computers 40 may advantageously include computers that are owned or controlled by the operator of the transactional server 30. For example, the operator of the transactional server can install the agent component on selected computers within each of the departments or organizations from which the transactional server is frequently accessed, including computers of actual end users.

For convenience, the computers 40 that host the agent 32 will be referred to as "agent computers," and a computer 35 that hosts the controller 34 will be referred to as a "controller computer." It should be understood, however, that a single computer could host two or more of the tool's components 32, 34, and 36, and that the functionality of the monitoring tool could be divided differently between components. In addition, the web reports server 36 and the transactional server 30 could be accessed through a common web site.

The controller 34 provides a user interface (UI) through which the operator of the transactional server can set up and initiate monitoring sessions, including distributed monitoring sessions in which the transactional server is accessed and monitored from multiple user locations. Through this UI, the user can, among other things, select the agent computers 40 to be included within a monitoring session, and assign transactions and execution schedules to such computers. The controller 34 also provides functions for specifying alert conditions, and for notifying personnel when such conditions exist. Example screens of the controller's UI are shown in FIGS. 2–12 and 16 and are described below.

The web reports server 36 provides functionality for allowing the operator to remotely monitor the operation of the transactional server 30, as measured and reported by the agent computers 40, using a standard web browser. In other embodiments, the reports server 36 could be configured to "push" the performance data, or reports generated therefrom, to a special client application for viewing. As described below, the agent computers 40 preferably report their transaction execution results performance data) to the reports server 36 in real-time (preferably via the controller 34, which checks for predefined alert conditions), allowing operator to view the real-time status of the transactional server. The reports server 36 may optionally be implemented by a "monitoring service provider" entity that stores and provides secure access to server status data for many different transactional servers and business entities; this approach relieves the operator of the transactional server under test from having to administer the reports server 36. Alternatively, each or some of the operators of the transactional servers under test could implement their own respective reports servers 36.

Figure 15:
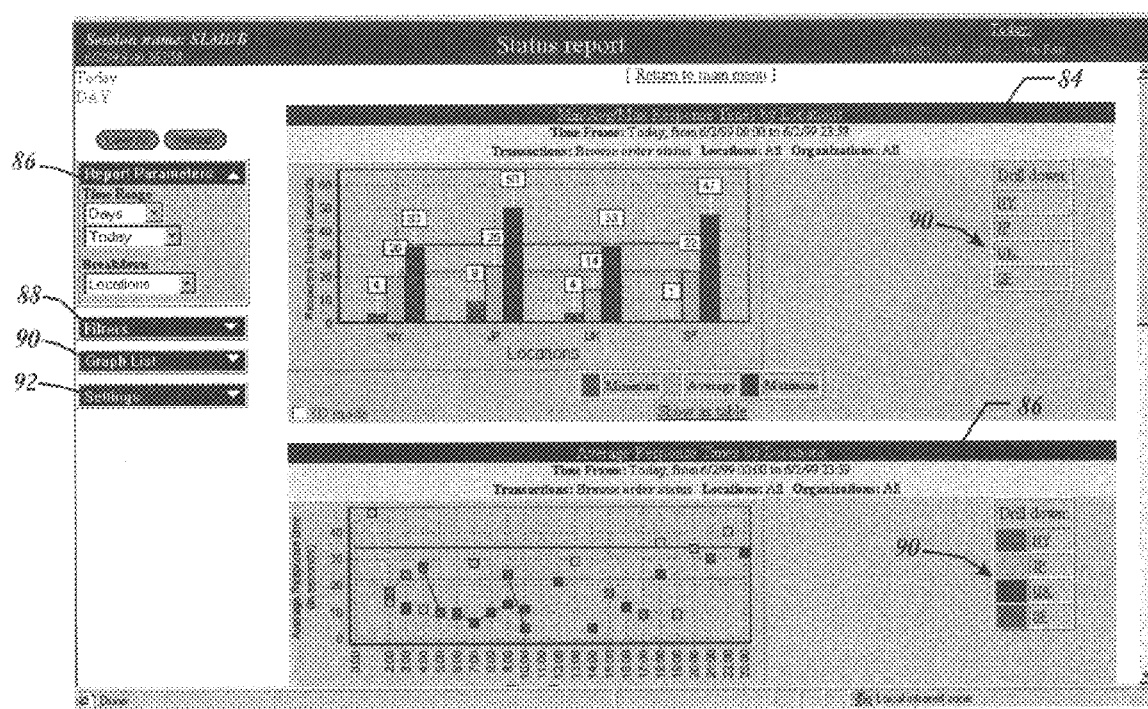

As described below, one important feature of the monitoring tool involves the ability of the user to monitor server performance according to operator-selected attributes of the agent computers 40. For example, using the reports server, 36, the user could view a graph of the average response time as measured by all agent computers in San Francisco, or by all computers that use a particular ISP. In one embodiment, the attributes of each agent computer include the computer's location, organization, and ISP, and can be assigned or modified via the user interface of the controller 34 (see FIG. 6). Other types of attributes, including user-defined attribute types, can additionally or alternatively be used. An example of a report in which performance is displayed separately for each location and transaction is shown in FIG. 15 and described below.

Another important feature involves the ability of the user to assign execution schedules to particular agent machines 40, including periodic schedules (e.g., once per hour on weekdays). Using this feature, the user can, for example, set up a monitoring session in which the transactional server 30 is proactively exercised and monitored on a continuous or near-continuous basis, and in which system administrators are notified immediately (such as by pager) as soon as an alert condition is detected.

II. Terminology

To facilitate an understanding of the invention, the following terminology will be used throughout the remaining description:

The term "distributed monitoring session" or "distributed session" refers to a monitoring session in which multiple agent computers 40 are used to monitor a transactional server 30.

The term "agent group" refers to the group of agent computers 40 included within a distributed session.

The term "agent" refers either to the agent component 32 generally, or to a particular copy or instance of the agent component running on an agent computer, depending upon the context in which the term is used.

The term "attribute" refers to a particular characteristic or property of a host or agent computer, such as the location, organization, ISP, or configuration of the computer.

The term "transactional server" refers to a multi-user system which responds to requests from users to perform one or more tasks or "transactions," such as viewing account information, placing an order, performing a search, or viewing and sending electronic mail. The term "operator" refers generally to a business entity that is responsible for the operation of the transactional server (typically the owner).

The term "testcase" refers generally to a computer representation of the transaction(s) to be performed by a particular computer to monitor a transactional server. In the preferred embodiment, the testcases include conventional test scripts (either in textual or executable form) that are "played" by the agent computers 40, although the testcases could alternatively be in other forms. Testcases may optionally include verification points that are used to test server functionality.

The term "web" indicates the use of the World Wide Web standards, such as HTTP.

III. Architecture and General Operation

In a preferred embodiment, the agent 32 is implemented using the commercially-available LoadRunner Virtual User (VUser) component of Mercury Interactive Corporation, and is capable of executing testcases generated using Mercury Interactive's LoadRunner, WinRunner and Astra QuickTest products. Examples of methods that may be used to generate and play testcases are described in co-pending U.S. applications Ser. No. 08/949,680 (filed Oct. 14, 1997) and Ser. No. 09/337,446 (filed Jun. 21, 1999), the disclosures of which are hereby incorporated by reference. Other known programming methods for simulating user actions and monitoring server responses may be used to implement the agent 32; in addition, application-specific hardware could be used to perform some or all of the agent's functions.

In the preferred embodiment, the agent 32 is installed on the agent computers 40 prior to initiation of monitoring sessions. Once installed, the agent can receive testcases and execution schedules from the controller 34 over the Internet or other TCP/IP based network via API calls. Alternatively, the agents 32 may be installed automatically by the controller 34 when a monitoring session is initiated. For example, the controller 34 could dispatch an agent 32 and a testcase (optionally as a single executable component) to each machine in the agent group, and the agents 32 could automatically delete themselves following testcase execution. Each agent 32 can preferably simulate the actions of multiple users.

Preferably, the agent group is selected so as to encompass a representative cross section of client attributes. For example, one or more agent computers 40 may be selected within each geographic area and/or department from which significant user activity is expected to originate.

In addition, a monitoring service provider entity, such as the entity that operates the reports server 36, may set up Internet hosts with various attributes (e.g., in various geographic locations, with a variety of different ISPs, etc.) and make such hosts available to its customers as agent computers 40. Such host computers are preferably provided by the service provider with the agent 32 pre-installed, and are configured to monitor multiple transactional servers (and thus service multiple operators) concurrently. This method is especially useful where the operator of the transactional server 30 would not otherwise have access to client computers with attributes of typical end users. For example, an operator of an electronic commerce Web site may not have access to host computers within the various countries or regions from which purchases are made. The method also relieves the operator of the burden of setting up and administering the agent computers 40.

As illustrated in FIG. 1, the controller 34 preferably includes or interoperates with a recorder 34A that provides functions for recording and editing transactions to be included within testcases. In a preferred embodiment, any one or more of the above-mentioned products of Mercury Interactive Corporation may be used as the recorder 34. Rather than recording new testcases, the user may optionally re-use testcases or testcase scripts that were created for pre-deployment testing of the transactional server 36. Other existing tools and testcase generation methods could be used to generate the testcases.

The controller 34 also includes a scheduler component 34B that is used to set up monitoring sessions. The scheduler 34B is preferably implemented using one or more "wizards" that step the user through the process of selecting agent computers, specifying the transactions to be performed by such computers, assigning execution schedules to the agent computers, and specifying criteria for generating alert events and notifications. Example screen displays provided by the scheduler 34B are included in FIGS. 3–12 and are discussed below.

The controller 34 also includes an automation interface 34C that provides methods for controlling the operation of the agents 32, including dispatching testcases and execution schedules to the agents. In a preferred embodiment, the automation interface is implemented using the LoadRunner 6.0 automation interface available from Mercury Interactive Corporation. The controller 34 further includes an alerts engine 34D that monitors some or all of the performance data generated by the agents 32 in real-time to check for user-defined alert conditions. Using the scheduler 34B, the alerts engine 34D can be configured to notify an operator of alert conditions by an appropriate communications method such as pager, cellular telephone, or email. For example, the alerts engine can be configured to page a system administrator whenever the average response time of the transactional server exceeds a certain threshold, or when the transactional server becomes inaccessible from any location or organization. The alerts engine 34D can also generate notifications that are based on the content (e.g., expected text strings or values) returned by the transactional server.

As depicted in FIG. 1, the controller 34 stores various test control data in local storage 38. The test control data typically includes testcase files (script files and related data files) for pre-recorded transactions, and session files that specify the various monitoring sessions that have been created.

As indicated above, the reports server 36 provides online, web-based access to the testcase execution (performance) data reported in real-time by agents 32. As depicted in FIG. 1, the performance data for the ongoing distributed sessions is stored within a central, "sessions" database 42, which is an ODBC compliant database in the preferred embodiment. One possible schema of this database 40 is described below. As depicted by FIG. 1, the components of the reports server 36 preferably include a web server 36A such as Microsoft Internet Information Server (IIS), an access control layer 36B which restricts access to the sessions database 42, a database access layer 36C, and a report generation component 36D. The database access layer 36C is implemented using a set of Active Server Pages (.ASP files) that use MDAC (Microsoft Data Access Components) to communicate with the sessions database 42. The ASP pages include an administration page (not shown) that can be accessed by users with administrator privileges to perform such tasks as adding new end users to the database 42.

The report generation component 36D is implemented using Microsoft ActiveX Data Objects (ADO), which provides functions for generating dynamic web pages. The dynamic web pages includes various pre-defined graphs and charts (see FIGS. 13–16) that are used to build customized, web-based reports. The reports server 36 could also be configured to disseminate the reports by email, fax, a push protocol, or other communications method.

IV. Controller UI and Session Setup

Figure 2:
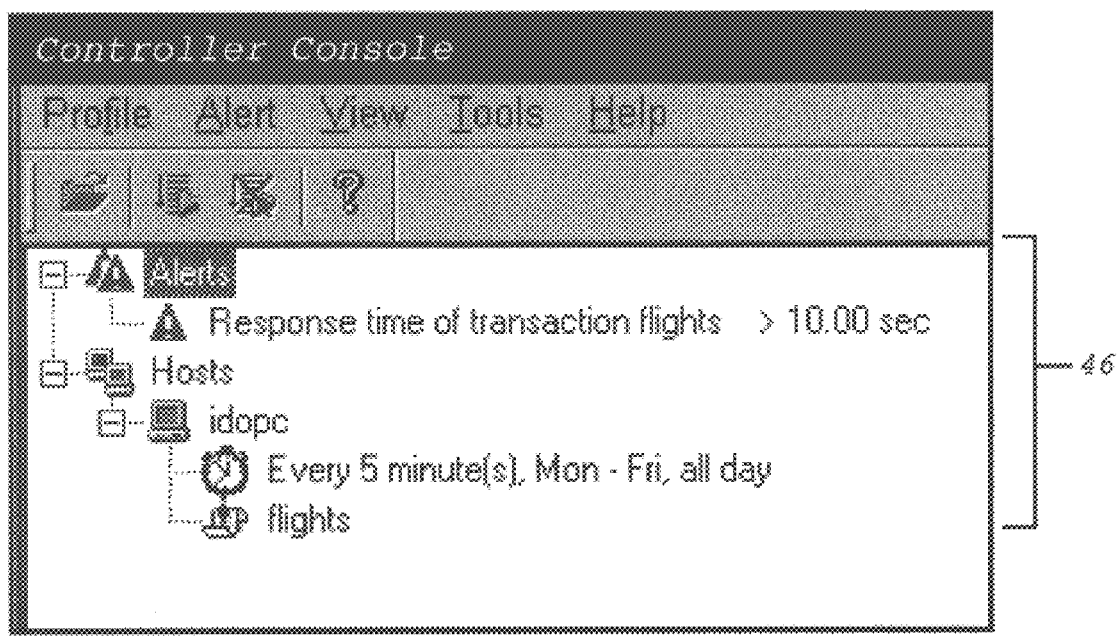
FIG. 2 illustrates a main user interface screen of the controller depicted in FIG. 1.
Figure 16:
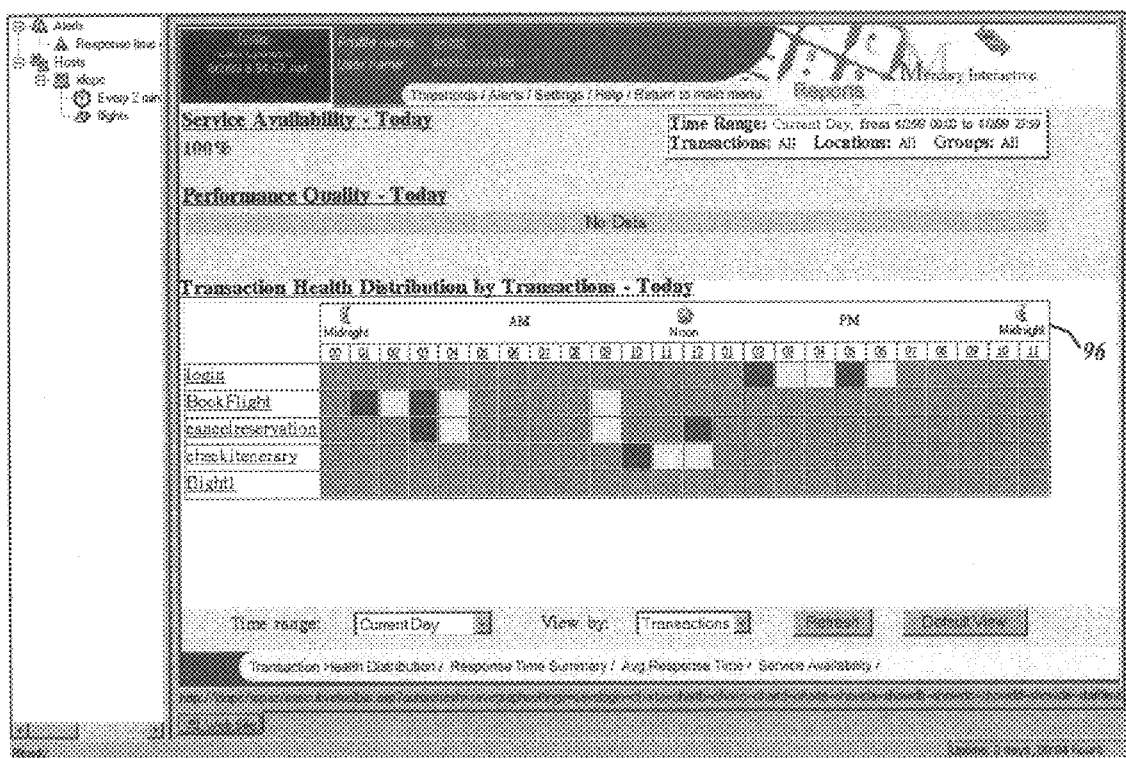

FIG. 2 illustrates the main screen or console for a preferred embodiment of the controller 34, with an example monitoring session (also referred to as a "profile") open and displayed in the tree window. The details of the monitoring session are graphically presented to the user as an expandable session tree 46 which shows the agent (host) computers, the testcase execution schedules assigned to each agent computer, and the transactions assigned to each agent computer. The session tree also shows any alert conditions that have been defined. In the simple example shown in FIG. 2, the monitoring session uses a single agent computer, "idopc," which has been assigned a single transaction "flights" and an execution schedule of "Every 5 minutes, Monday–Friday, all day." The monitoring session includes a single alert under which an alert event will be triggered if the response time of the transaction "flights" exceeds 10 seconds. The expandable tree can advantageously be used to edit a monitoring session through drag-and-drop and other standard functions provided by the Windows operating system. As illustrated in FIG. 16, the controller's UI also provides a browser window through which a user can view report pages from the reports server 36.

The controller's menu, the top level of which is shown in FIG. 2, provides functions for performing various session-related tasks, including launching the Setup and Alerts Wizards (described below), opening and editing an existing monitoring session, starting and stopping monitoring sessions, specifying the address of the reports server 36 to be used with a monitoring session, clearing the contents of the database 42, and specifying settings for sending alert notifications.

Figure 3:
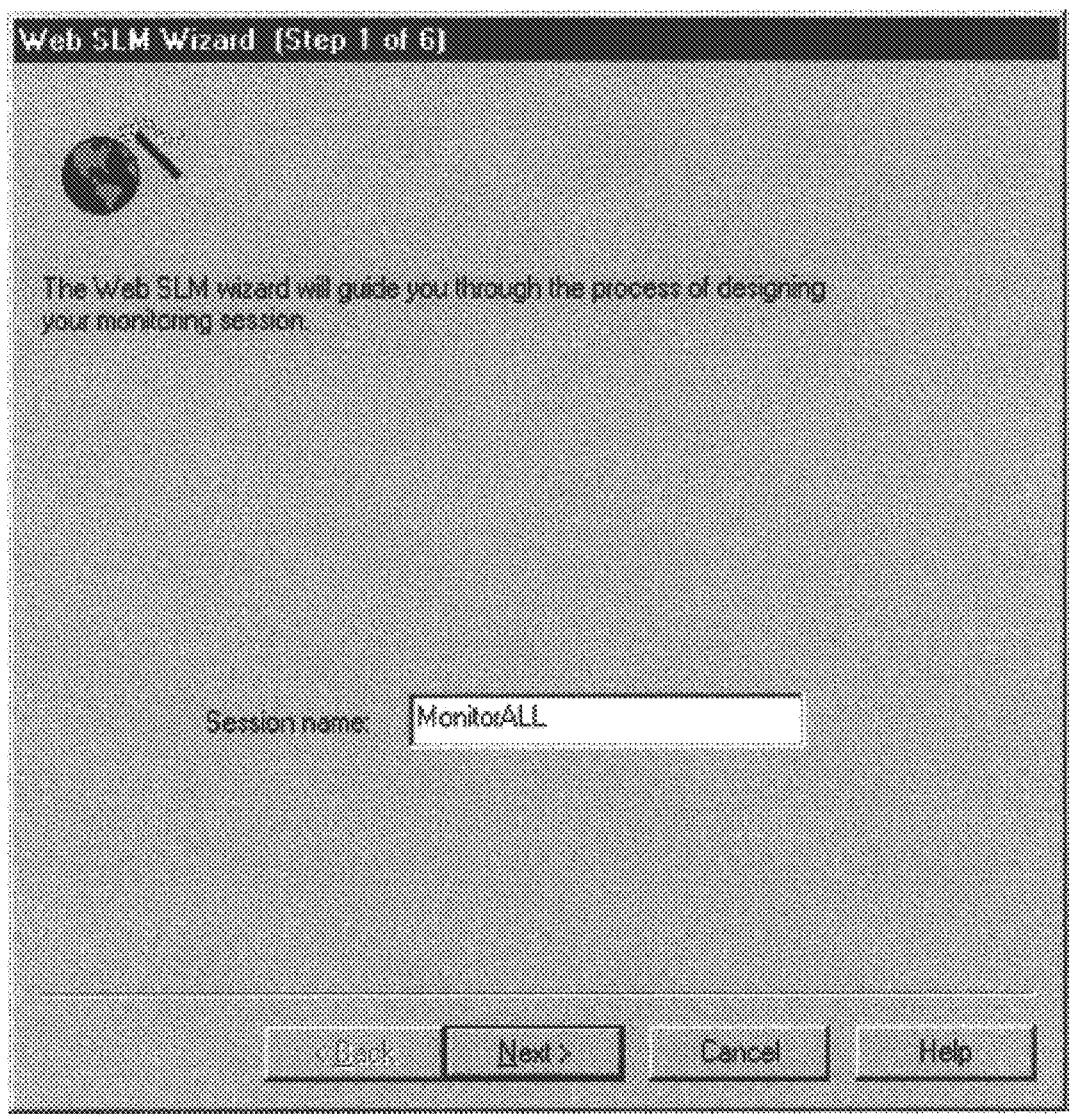
FIGS. 3–9 illustrate the controller's Setup Wizard screens that are used to set up monitoring sessions.
Figure 4:
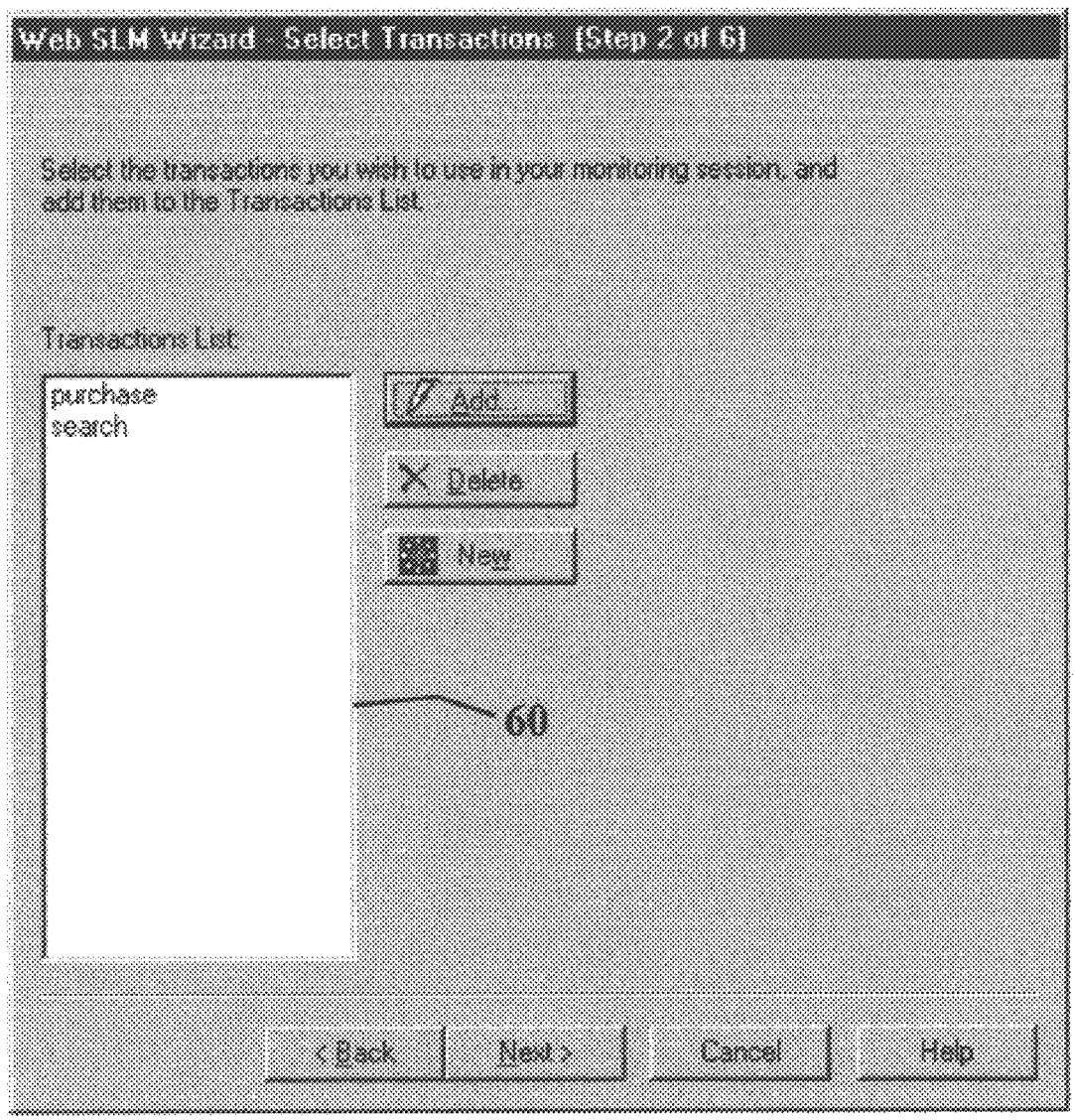

To create a new monitoring session, the user selects PROFILE/NEW, which causes the controller 34 to launch a Setup Wizard (FIGS. 3–9). As illustrated by FIG. 3, the user is initially prompted to specify a session name. The session name provides a mechanism for later retrieving or viewing the reports for a particular monitoring session. As illustrated in FIG. 4, the user is then presented a "Select Transactions" screen for specifying the previously-generated transactions to be included within the monitoring session. The user can also use the NEW button to launch the recorder 34A and record a new transaction. The transactions may optionally include verification points that specify expected server responses, such as particular values or text strings within web pages. Alternatively, the transactions may stress the transactional server without verifying the content of the server responses. As described below, the user can later assign specific transactions, or sets of transactions, to specific agent computers 40, and can monitor the performance of the transactional server on a transaction-by-transaction basis.

In the preferred embodiment, the user can freely define what constitutes a "transaction" for monitoring purposes. For example, the user can start recording a user session, record any number of user interactions with the server (form submissions, page requests, etc.), stop recording, and then store the result as a transaction under a user-specified name (e.g., "browse catalog"). In addition, during subsequent editing of the transaction, the user can optionally divide the transaction into multiple smaller transactions or make other modifications. The transactions can also include accesses to multiple web sites. Preferably, the transactions are defined by the user with sufficient granularity to facilitate identification of performance bottlenecks. For example, the user may wish to create a separate transaction for each of the primary applications deployed on the transactional server 30 so that each such application can be monitored independently.

The transactions included within the session may optionally include special non-destructive or "synthetic" transactions that do not change the state of the transactional server 30. If destructive transactions are used, the transactional server 30 may optionally be configured to handle such transaction in a special, don-detructive manner. This may be accomplished, for example, by setting up dummy accounts for monitoring purposes. In addition, where appropriate, the transactional server 30 may be preprogrammed to roll back its databases, or to otherwise ignore the transaction, when a particular dummy account, credit card number, username, or other unique element is used.

Figure 5:
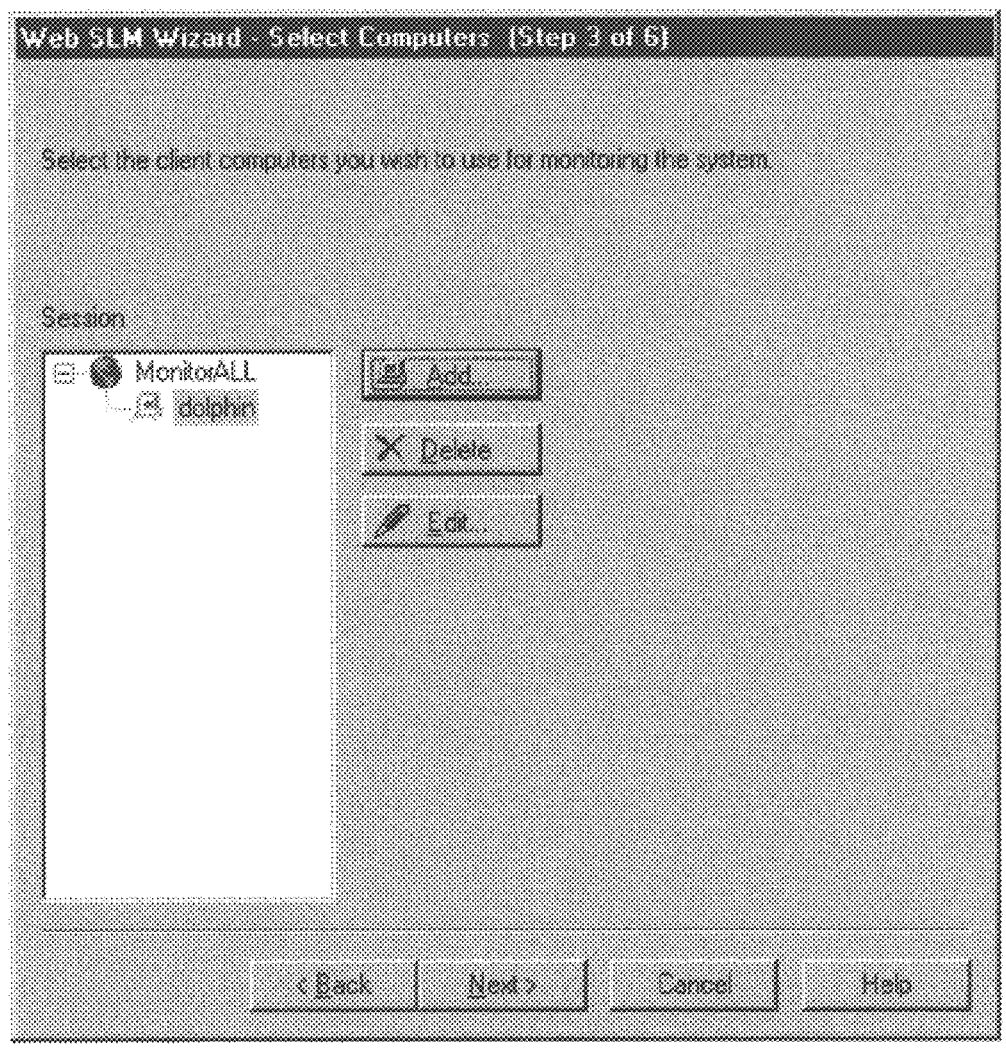

As illustrated by the "Select Computers" screen in FIG. 5, the next step in the setup process involves selecting the computer or computers to be included in the agent group. By selecting the ADD button from this screen, the user can view and select from a standard Windows NT® tree view of the host computers that are available for use. In one embodiment, the tree view displays only those computers on which the agent 32 is installed. In another embodiment, the tree view also lists computers that do not have the agent 32 stored thereon, and provides an option for the user to remotely install the agent on such computers. As indicated above, the computers that are available for use may optionally include computers that are made available by a monitoring service provider; in such implementations, the Setup Wizard 34 may be configured to automatically retrieve a list of such service provider computers and their respective attributes from a special Internet host. Techniques for generating and accessing lists of available servers are well known in the art, and are therefore not described herein. The selected computers are added to the session tree 46 as respective nodes or icons.

Figure 6:
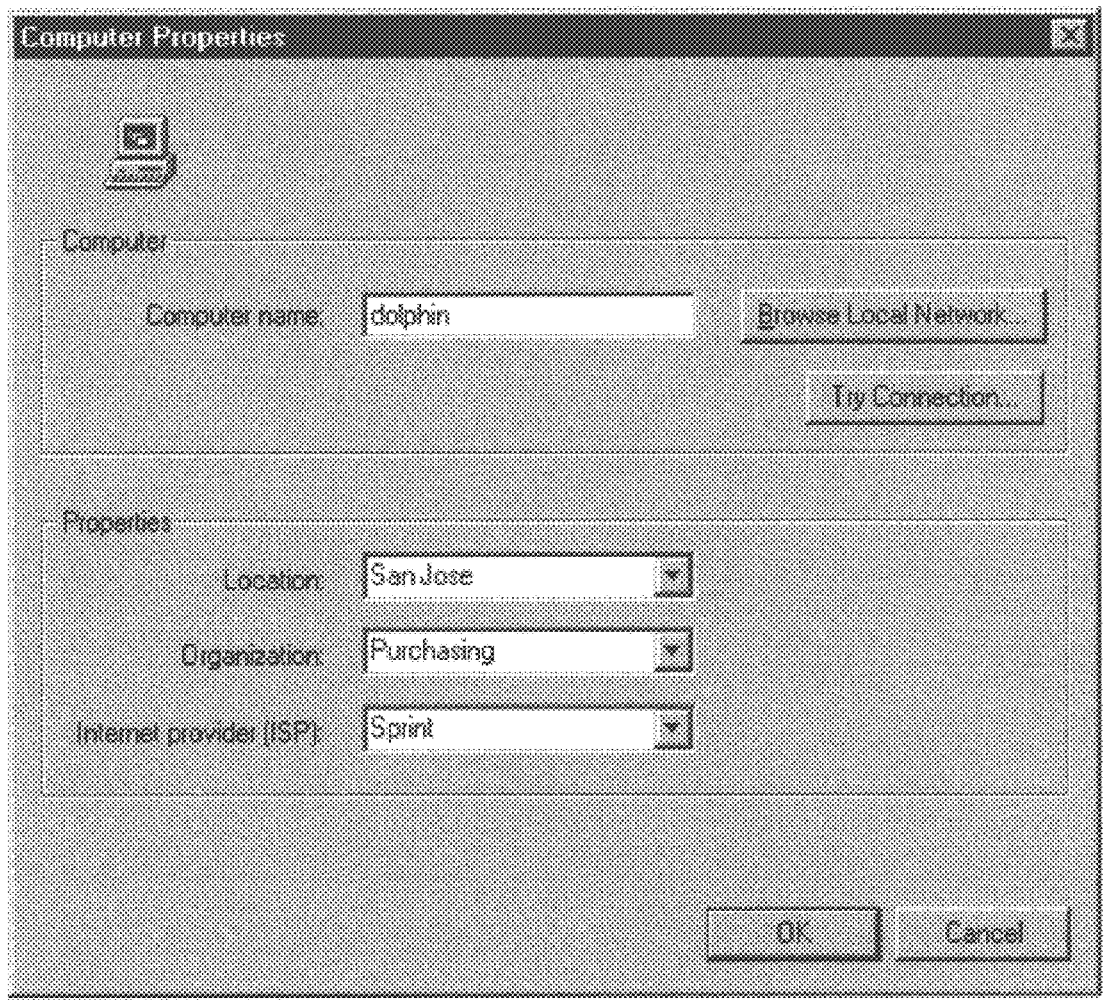

When the user selects the EDIT button (FIG. 5) with a computer selected in the session tree 46, the user is presented with a "Computer Properties" screen as shown in FIG. 6. From this screen, the user can assign various attributes (properties) to the computer or confirm previously-assigned attributes. In the illustrated example, the attribute types are the location (e.g., city), organization (e.g., accounting department), and ISP of the agent computer 40. Other pre-defined attributes types that may be provided include, for example, a group name, the computer's operating system, the router to which the computer is connected, the computer's modem or other connection speed, the computer's default web browser (particularly if the agent uses or emulates the browser), and the hardware configuration of the computer. In addition, the controller 34 and the reports server 36 may provide the user an option to create one or more user-defined attribute types, and to use such attribute types in the same manner as the pre-defined attribute types. It should be understood, therefore, that the specific attributes and attributes types shown in the figures are merely illustrative, and are not intended to limit the invention.

The attributes that are assigned to the agent computers can be used to separately view the transactional server's performance as monitored by a particular attribute group (group of computers that share a particular attribute or set of attributes). For example, the user can view a graph of the response times measured by all agent computers with the location attribute "San Jose" or the ISP attribute "Sprint." Example reports are shown in FIGS. 13–16 and are described below. The user can also generate attribute-filtered reports to exclude performance data associated with specific attributes from consideration (as described below). The ability to view and monitor performance separately for each attribute group and to generate attribute-filtered reports greatly facilitates the task of identifying attribute-specific performance problems.

Figure 7:
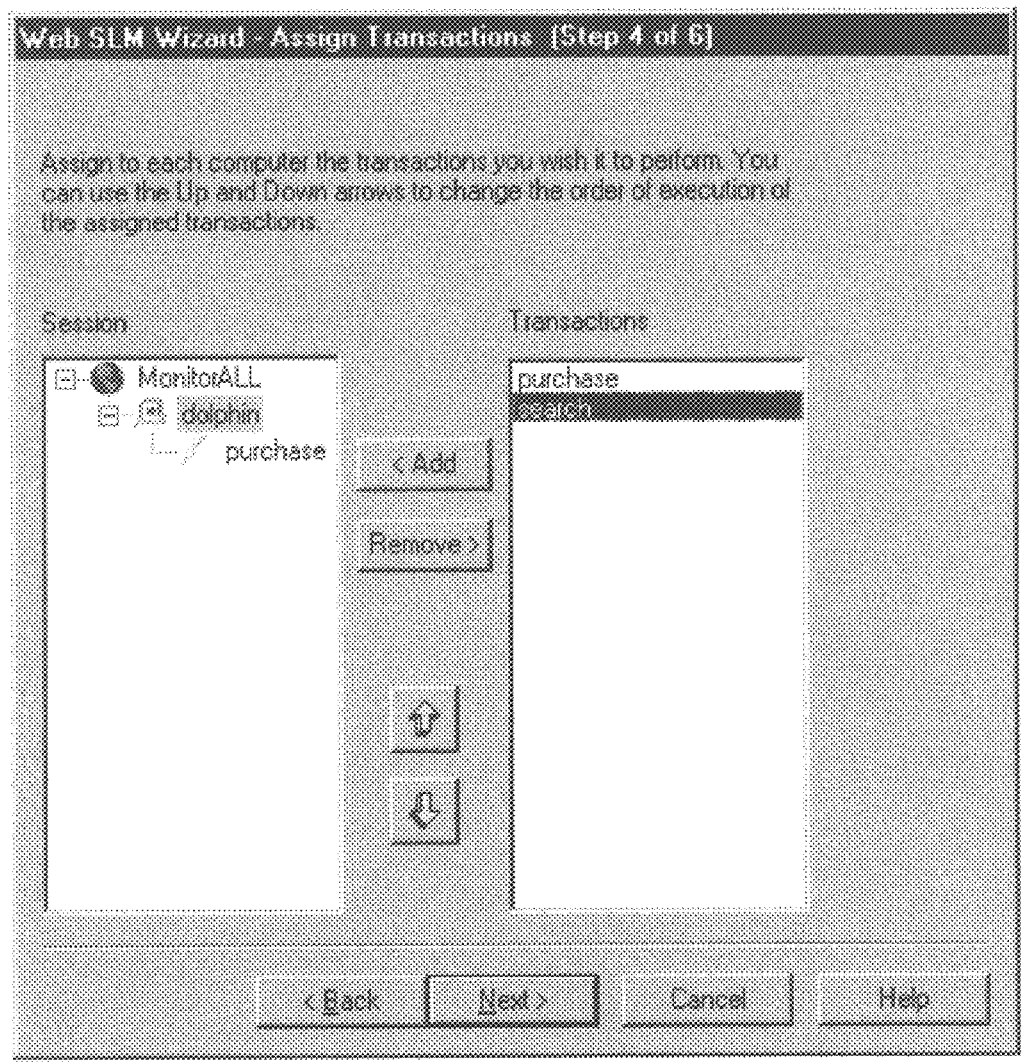
Figure 8:
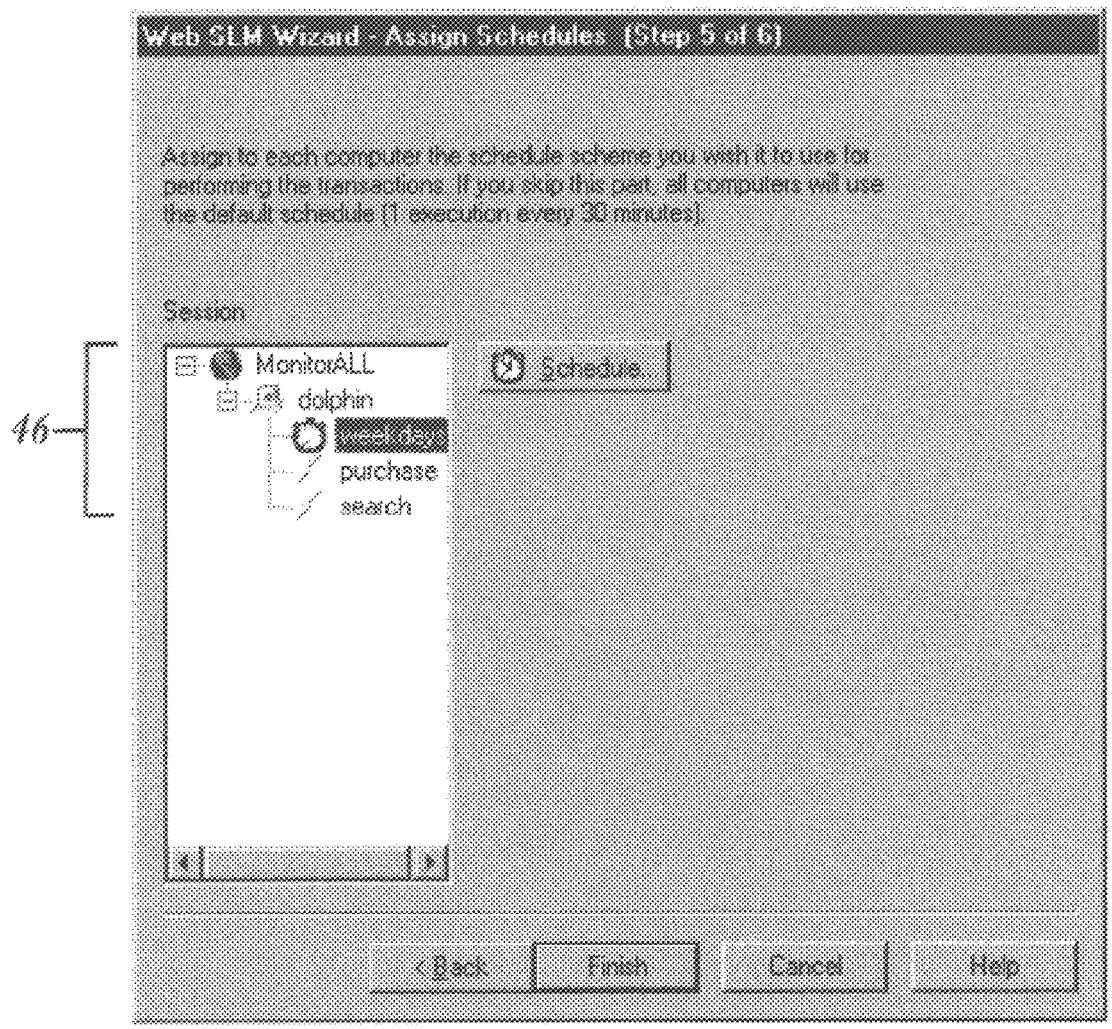

When the user selects the NEXT button from the Select Computers screen, an "Assign Transactions" screen (FIG. 7) appears. From this screen, the user can assign transactions (from the previously-created transactions list) to specific computers in the agent group. The user can also specify, for each computer, the order in which that computer is to execute the assigned transactions. As transactions are assigned to agent computers 40, the transactions are added to the session tree 46 as children of their respective computers (as illustrated in FIGS. 7 and 8 for the computer "dolphin").

Figure 9:
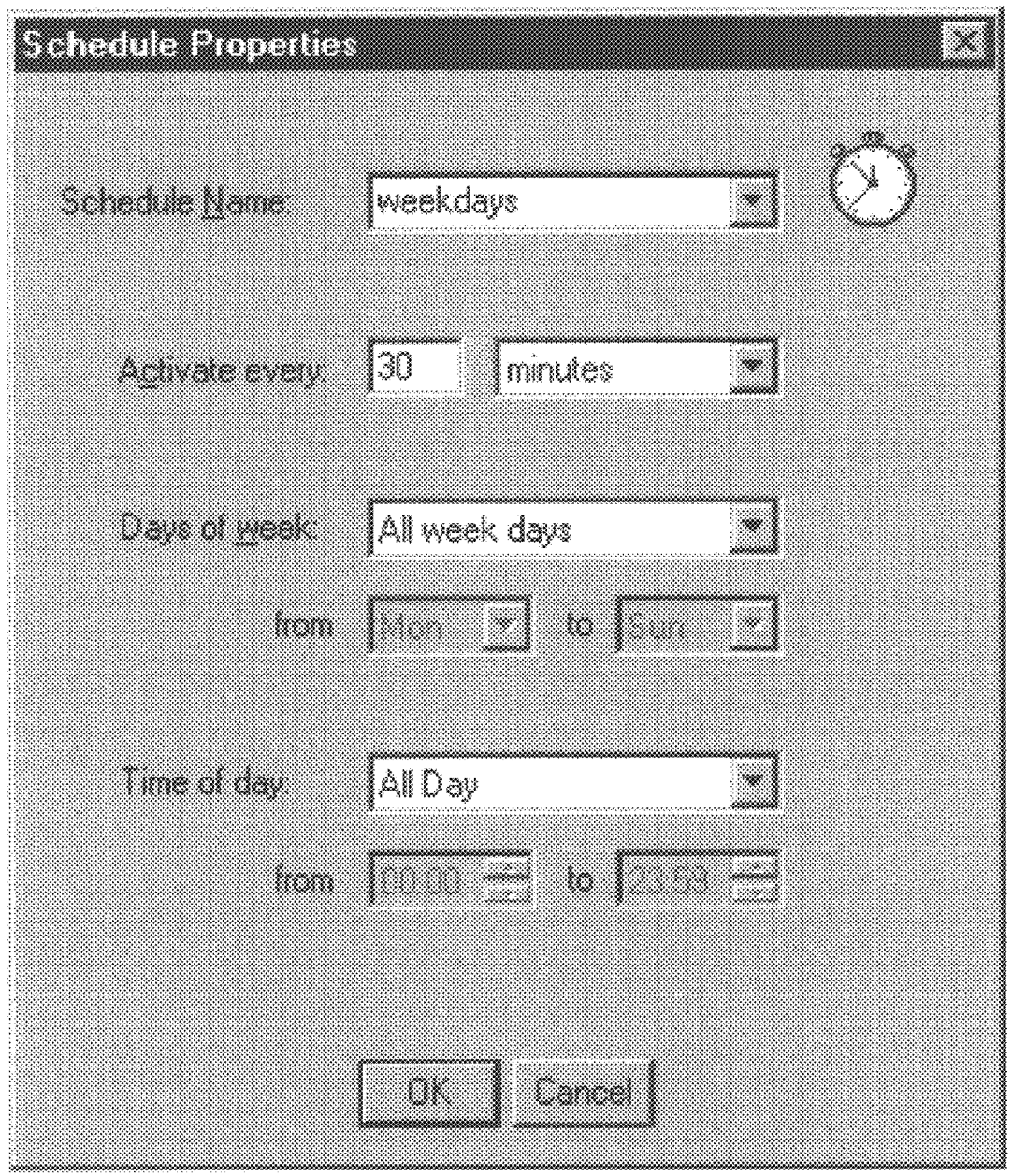

When the user selects the NEXT button from the Assign Transactions screen, an "Assign Schedules" screen appears (FIG. 8) that allows the user to assign a testcase execution schedule to each computer. When the user selects the SCHEDULE button with a computer selected in the session tree 46, a "Schedule Properties" box appears (FIG. 9). From the Schedule Properties box, the user can select a predefined execution schedule (e.g., "weekdays") to assign to the computer and/or define a new schedule. As illustrated in FIG. 9, periodic schedules may be used. The periodic schedules may optionally include pseudo-random schedules. As shown in FIG. 8, the schedules are added to the session tree 46 as children of their respective agent computers. In other embodiments, the schedules may be assigned on a transaction-by-transaction basis.

The execution schedules may be selected so as to provide continuous or near-continuous monitoring of the transactional server 30. By staggering the execution schedules so that different agent computers 40 monitor the transactional server 30 at different times, the transactional server 30 can optionally be monitored continuously (24 hours per day) or nearly continuously without using any single agent computer 40 for an extended period of time. For example, if the agent computers 40 are distributed around the globe, the schedules can be assigned so that no agent computer 40 is used for testing during employee work hours within its respective region.

The Setup Wizard may optionally provide one or more functions (not illustrated) for assisting users in setting up continuous or near-continuous monitoring sessions. For example, as the schedules are being assigned to agent computers, the wizard could automatically detect and display the "gaps" (periods of time during which the transactional server is not being monitored) in the cumulative execution schedule. The Setup Wizard could also provide an option to automatically generate an execution schedule which fills-in these gaps. In addition, a function could be provided for ensuring that at least two agent computers 40 are scheduled to execute testcases at all times, so that the failure of a single agent computer will not cause the transactional server to go unmonitored.

When the user selects the FINISH button (FIG. 8) from the Assign Schedules box, the Setup Wizard closes and the user is presented with a view of the complete session tree 46. At this point, controller 34 dispatches the testcases and execution schedules to the respective agent computers 40, and sends various session configuration data (session name, transaction identifiers, attributes of agent computers, etc.) to the reports server 36 for storage in the sessions database 42. The controller 40 also stores a representation of the monitoring session in local storage 38. The general flow of information to and from the controller computer 35 is described below with reference to the data flow drawings of FIGS. 17 and 18. Once the setup process is completed, the monitoring session continues indefinitely until halted or terminated by the user.

Figure 10:
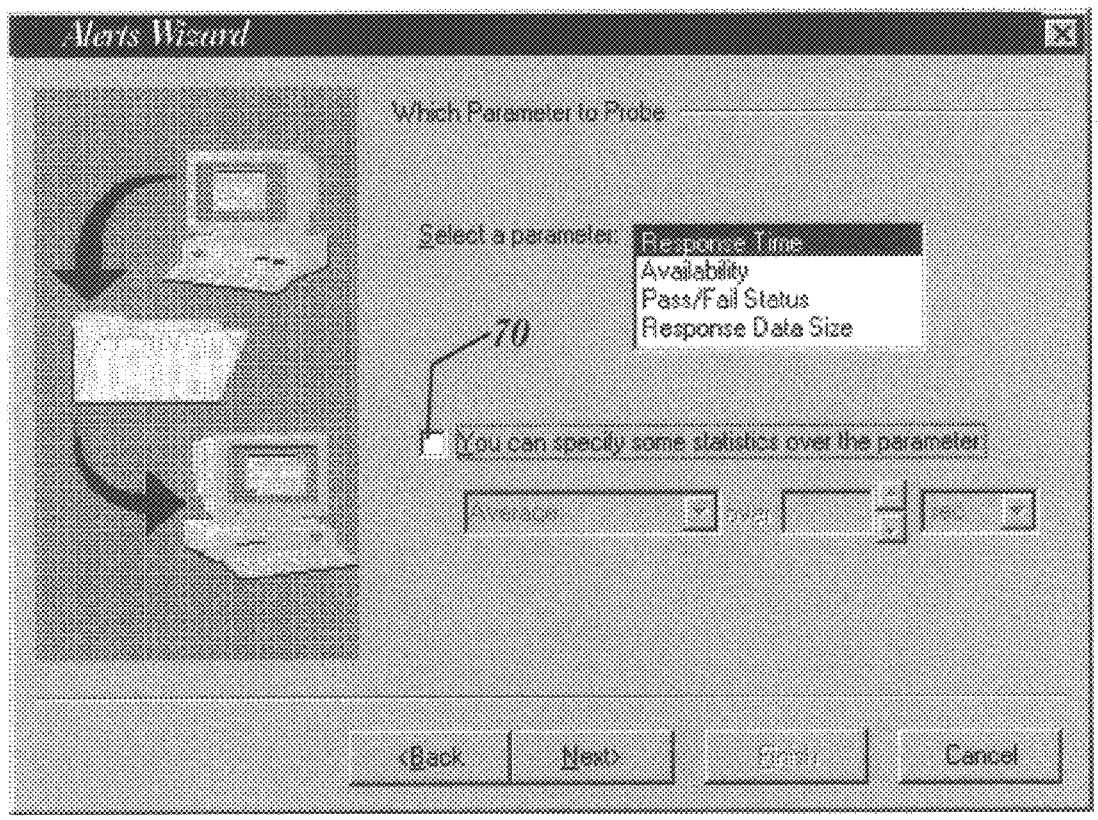
FIGS. 10–12 illustrate screens of the controller's Alerts Wizard.
Figure 11:
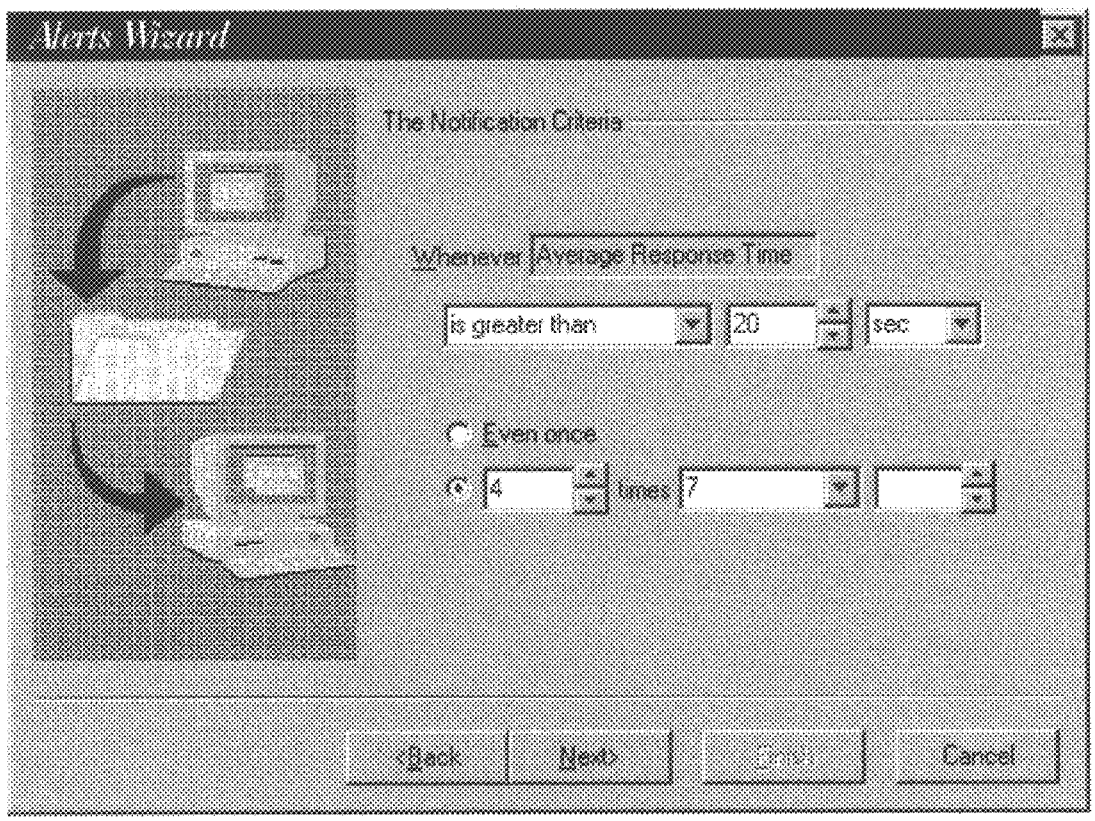
Figure 12:
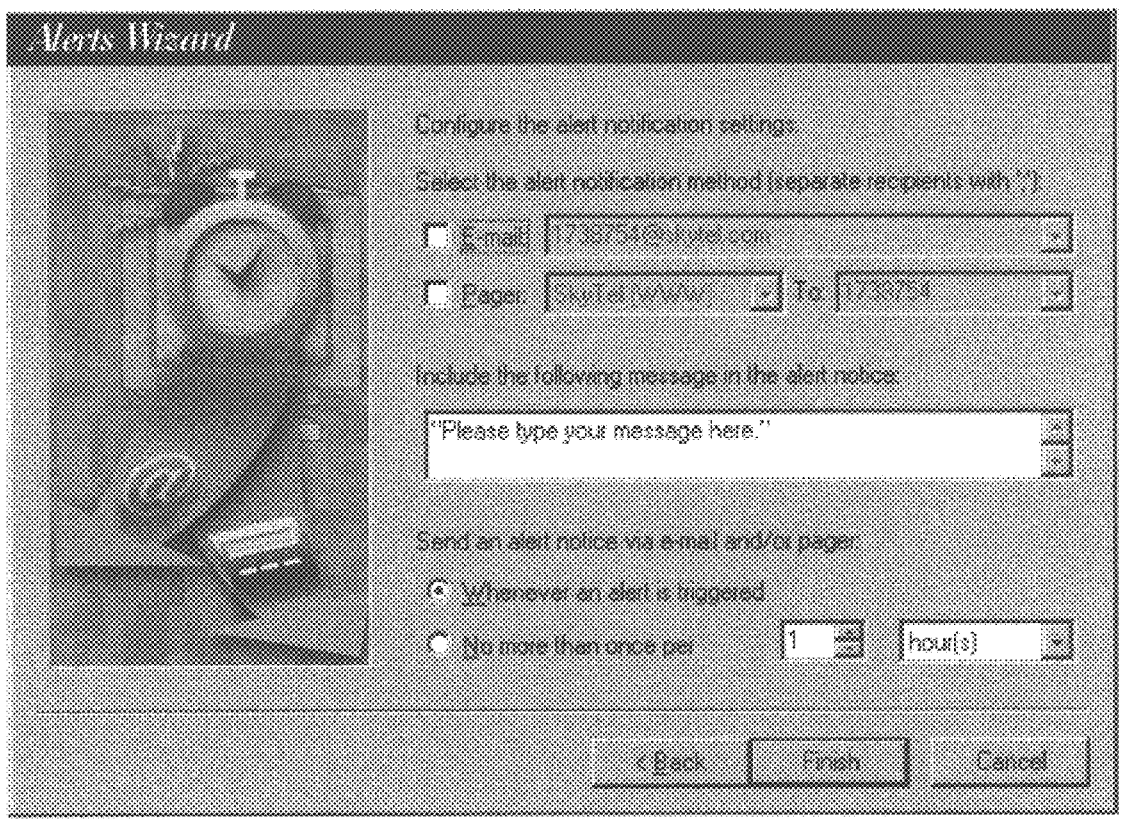

With the session open within the controller's console (FIG. 2), the user can select ALERT/ADD from the main menu to launch an Alerts Wizard (FIGS. 10–12). As illustrated by FIG. 10, the Alerts Wizard allows the user to specify one or more performance parameters to monitor in real-time for purposes of generation alerts, including response time, availability, pass/fail status, and response data size. By selecting the check box 70, the user can specify certain parameter statistics to monitor, such as the average of the parameter over a specified time frame.

As illustrated by FIGS. 11 and 12, the Alerts Wizard also provides screens for specifying notification criteria for the parameters to be monitored. In the example shown in FIG. 11, the user can request to be notified whenever the average response time exceeds a specified threshold, or exceeds the threshold with a specified frequency (e.g., 10 times per minute). As shown in FIG. 12, the user can also request to be notified by pager or email of an alert condition.

The Alerts Wizard may also provide an option (not illustrated) to be notified when certain types of transactions fail, and/or when failures are detected within particular attribute groups. Using this option, a user can request to be notified whenever a problem is detected which falls within the user's respective area of responsibility. For example, a system administrator responsible for a particular business process may be notified when a transaction that corresponds to that business process fails; to avoid being notified of general failures, this notification may be made contingent upon other types of transactions completing successfully. Other example uses of this feature include: notifying an ISP administrator when a threshold number of agent computers using that ISP are unable to access to the transactional server (optionally contingent upon the transactional server being accessible from other ISPs); and notifying a system administrator responsible for a particular office when a threshold number of agent computers 40 within that office are unable to access to the transactional server (optionally contingent upon the transactional server being accessible from other offices).

In other embodiments of the invention, the various functions of the controller 34 could be implemented in-whole or in-part by the reports server 36. For example, the above-described functions of the Alerts Wizard, and the associated functionality of the alerts engine 34D, could additionally or alternatively be implemented by the reports server 36 such that users can remotely set up and modify alert conditions. The task of checking for alarm conditions could also be performed by the agents 32.

In one embodiment, the controller 34 is hosted by an ASP (application service provider) as a service that is accessed over the Internet using a conventional web browser. Through the ASP's servers, each customer is given secure access to its respective repository of testcase and session files. The service's user interface for setting up monitoring sessions may be generally the same as shown in FIGS. 2–12, with the dialog boxes replaced by corresponding web pages. Test scripts (transactions) may be recorded using a server-side recorder, and/or may be recorded by the customer using a downloadable recorder and then uploaded to the server. The ASP, which may also operate the reports server 36 and/or the agents computers 40, may charge customers for monitoring sessions based on one or more of the following criteria, as well as others: number of transaction types monitored, number of transaction execution events, quantity of hardware resources used, and time schedule and duration of monitoring sessions. One important benefit of operating the controller 34 in this manner is that monitoring sessions can be initiated and modified from any computer that has Internet access, without the need for any special software. Another benefit is that the customer is relieved of the burden have having to install and maintain the controller software.

In embodiments in which the controller 34 is hosted as a service, the task of assigning execution schedules to the agent computers 40 may be performed by the ASP, rather than by the end user. This strategy is particularly useful where the agent computers 40 are shared by many different customers, as it allows the ASP to distribute the load across the agent computers so as to generally maximize the total number of distributed monitoring sessions that can exist concurrently. A hybrid approach is also possible in which the customer controls the execution schedules of the customer's own agent computers 40 while the ASP controls the execution schedules of the shared agent computer's that are under the ASP's control.

In yet other embodiments, the controller 34 may be hosted by a server on a private intranet, such as the intranet of the operator of the transactional server. In such configurations, the controller preferably operates the same as if hosted by an ASP, but is private to the operator.

V. Performance Reports

Figure 13:
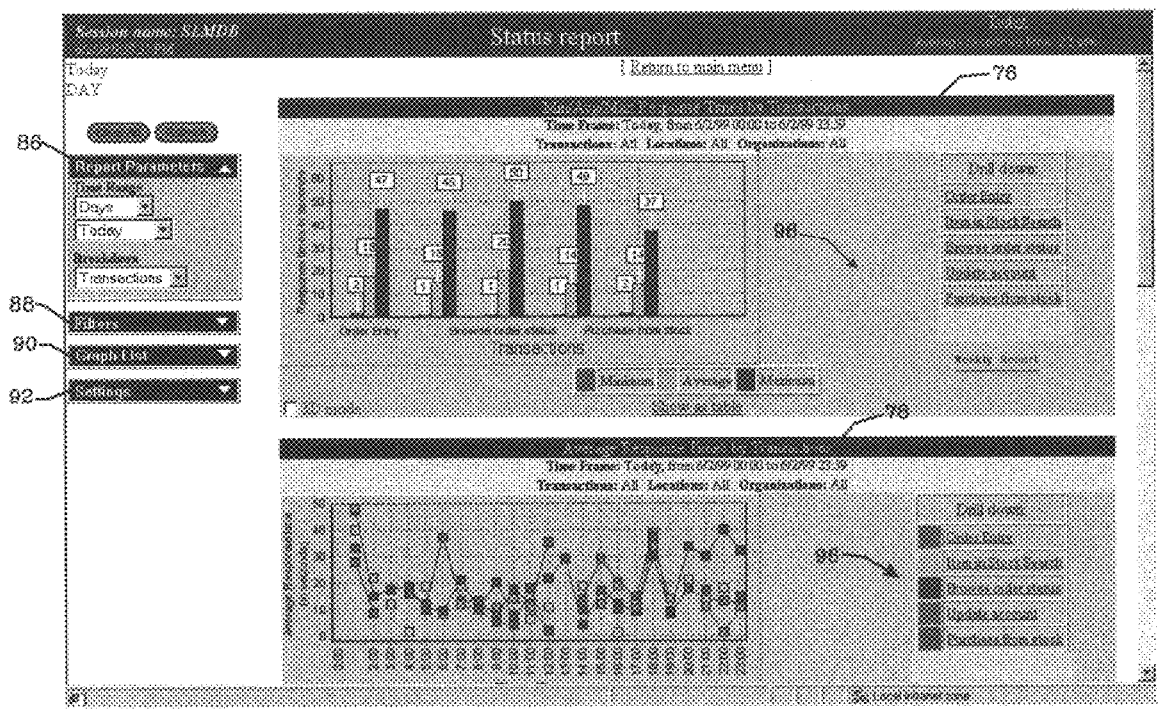
FIGS. 13–16 illustrate example status report web pages provided by the web reports server in FIG. 1, with FIG. 14 illustrating a representative "drill down" page returned when the user selects the drill down link in FIG. 13 for the "browse order status" transaction.
Figure 14:
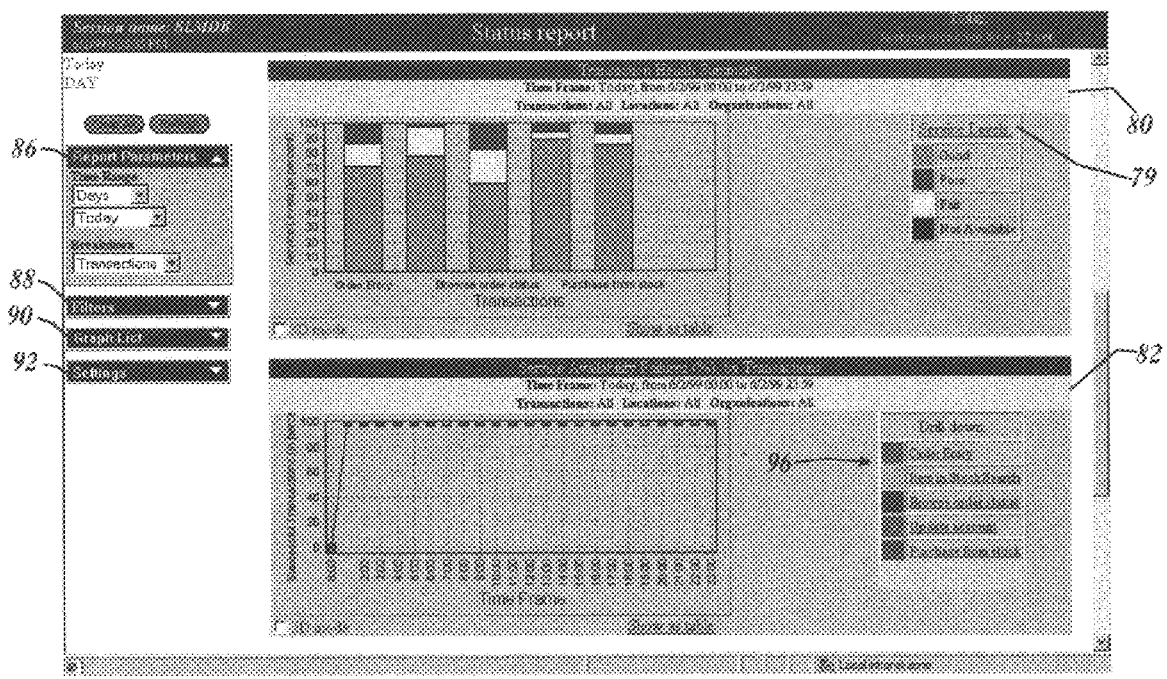

FIGS. 13–15 illustrate examples of the types of graphs or charts that may be provided by the reports server 36 to facilitate remote monitoring of the transactional server 30. The examples shown in FIGS. 13–15 illustrate a monitoring session involving five transactions: Order Entry, Item in Stock Search, Browse Order Status, Update Account, and Purchase from Stock. The transactions are being executed from agent computers 40 located in four geographic regions: New York, Japan, United Kingdom and San Francisco. More than one agent computer may be used in each such location. The names and granularities of the geographic locations can be defined by the operator during the setup process.

The graphs indicate various aspects of the transactional server's performance as monitored over a particular time frame (the current day in this example). The first graph 76 (FIG. 13) shows the minimum, average, and maximum transaction times for each of the five transactions. The second graph 78 (FIG. 13) shows the average response time for each transaction and each one-hour interval, using a color coding scheme to distinguish between the transactions. The third graph 80 (FIG. 14) shows the distribution of service levels for each of the five transactions, using a unique color for each level. The fourth graph 82 shows, for each one-hour interval and each transaction, the percentage of transactions that failed.

As illustrated in FIG. 13, the report pages preferably include various links and controls for allowing the user to generate customized and attribute-filtered views of the performance data. For example, if the user selects the "drill down" link for the "browse order status" transaction, a page appears which includes the graphs 84, 86 shown in FIG. 15. Both graphs 84, 86 shows aspects of the server response time for the Browse Order Status transaction broken down by location, as may be desirable to identify location dependent problems. The horizontal line in these graphs 84, 86 represents a user-defined alert threshold. From this page, the user can drill down an additional level (by selecting the location-specific drill down links 90) to view location-specific graphs for the Browse Order Status transaction.

With further reference to FIGS. 13–15, the "Report Parameters" window 86 allows the user to modify the time frame and/or the breakdown method used to generate the various graphs and charts. By modifying the breakdown method, the user can view the performance data separately for each transaction and for each attribute of the agent computers. In one embodiment, the performance data can be viewed by transaction (shown in FIGS. 13 and 14), by location (shown in FIG. 15), by organization (not illustrated), and by ISP (not illustrated). In other embodiments, the performance data can be broken down according to other attribute types, including attribute types defined by the operator.

The "Filters" option 88 (FIGS. 13–15) allows the user to filter the displayed information by transaction and by each of the attributes. Using this feature, the user can, for example, filter out from the reports the performance data corresponding to a particular transaction, location, organization, ISP, or combination thereof. In one embodiment (not shown), the user specifies the filter to be applied by completing a web form that includes a respective check box for each transaction and each attribute used in the monitoring session. The application of a filter, if any, is indicated by the notations at the tops of the graphs (e.g., "Transactions: All; Locations: UK, NY; Organizations: accounting, marketing").

The Graph List option 90 allows the user to specify the set of default graphs that are to appear on the main status reports page. The "Settings" option 92 allows the user to adjust and save other types of settings, such as an "auto refresh" rate (e.g., every five minutes) and a starting date/time to be used within the reports.

FIG. 16 illustrates an example "Transaction Health Distribution" chart that may be generated by the reports server 36. In this example, the chart is being viewed through the browser window of the controller's interface. The chart is in the form of a 2-dimensional matrix. The horizontal dimension represents the timeframe, which can be modified by the user over a range of hours to years. In this example, the columns represent hours of the current day (as displayed along the top of the chart), and the rows represent the transactions being monitored (as listed at the left). The cells of the matrix are color-coded to reflect the response time of the particular transaction during in the particular time frame. Each hour and each transaction is a hyperlink that, when selected, causes the view to change. For example, if the user clicks on a particular hour, the timeframe changes to just that hour with the matrix's horizontal dimension broken down into smaller (e.g., 5 or 10 minute) intervals. Similarly, when the user clicks on a transaction link, the vertical dimension changes so that the chart shows only the selected transaction, broken down according to geographical location (or possibly another computer attribute).

As will be apparent from the foregoing examples, the ability to separately view and filter the performance data based on the attributes of the agent computers, including operator-specified attributes, greatly simplifies the task of identifying attribute-specific problems. Although specific attribute types are shown in the example reports, it should be understood that the illustrated features can be applied to other types of attributes, including user assigned attribute types.

The reports server 36 also preferably provides access to an Alerts chart (not shown) which contains information about the various alert events that have occurred. For each alert event, this chart may include, for example, an alert name, a color-coded indication of the alert severity, the time of the alert event, the action taken (e.g., "email sent to admin@merc-int.com" or "logged only"), and the text of any alert message sent.

VI. Data Flow and Database Content

The general flow of information between components during the setup and execution of a typical monitoring session will now be described with reference to FIGS. 17–19.

Figure 17:
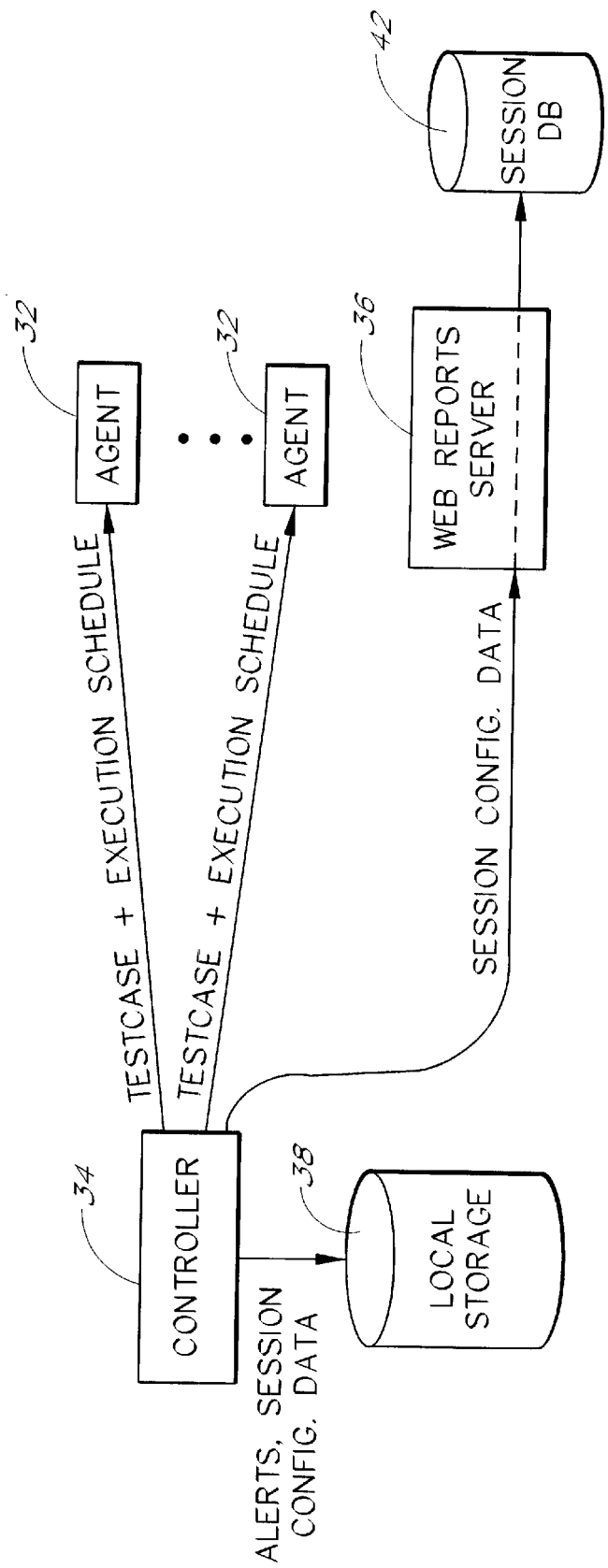
FIGS. 17–19 are flow diagrams that illustrate the flow of information between components during the setup and execution of a monitoring session.

FIG. 17 illustrates the "setup" or "programming" phase of a monitoring session. As depicted by the left-to-right arrows in FIG. 17, once the user completes the setup process, the controller 34 dispatches the testcases (transactions) and schedules to the respective agents 32. Where the agents 32 reside on remote agent computers 40, the testcases and schedules are communicated over the Internet using HTTP or another a TCP/IP based protocol via API calls. As further depicted by FIG. 17, the controller also sends session configuration data to the reports server 36 (preferably using HTTP) for storage in the sessions database 42. The configuration data includes the session name, identifiers and properties (attributes) of the agent computers 40, and identifiers and names of the transactions. Where the reports server 36 services multiple business entities, the configuration data may also include a username or other identifier of the business entity to which the session corresponds.

Table 1 summarizes, for one example embodiment, the tables that are created in the sessions database 42 for each monitoring session and used to generate the reports. Any of a variety of alternative database schemas could be used. The various metrics that are displayed in the reports (e.g., average response time over a particular window) are calculated using the data stored in the event meter table.

TABLE 1

EXAMPLE DATABASE SCHEMA

| TABLE NAME | DESCRIPTION |
| --- | --- |
| Groups | Contains the names of all agent computers and their associated properties. |
| Transactions | Contains a listing of the transactions, by name, with each assigned a numerical transaction ID. For each transaction, the table contains the thresholds used for evaluating response times (e.g., less than 20 sec. = OK, from 20 to 30 sec. = poor, etc.). |
| Status | Contains a listing of the available transaction statuses (e.g., Pass = 0, Fail = 1, etc.). |
| Ranks | Contains a listing of the threshold criteria names (e.g., 1-OK, 2 = Warning, etc.). |
| Properties | For each property defined by the user, a table is created that assigns a numerical ID to the set of members of that property (e.g., for the "organizations" table might include the entries R&D = 1, Marketing = 2, etc.). |
| Event Meter | Contains the results of each transaction execution event. Each transaction execution event is represented by a record which contains the following data: record ID (increases sequentially with each new execution event), transaction ID, result (status value), date/time, response time in seconds, and properties of agent computer (location, organization, etc.) |
| Alarms Definitions | Contains definitions of events that trigger alarms |
| Alarms | Stores a log of triggered alarm conditions |

As depicted by the downward arrow in FIG. 17, any alerts set up by the user are stored in local storage 38 along with session configuration data. The alerts may additionally or alternatively be communicated to the reports server 36, in which case the reports server may handle the task of checking for and notifying users of alert conditions.

Figure 18:
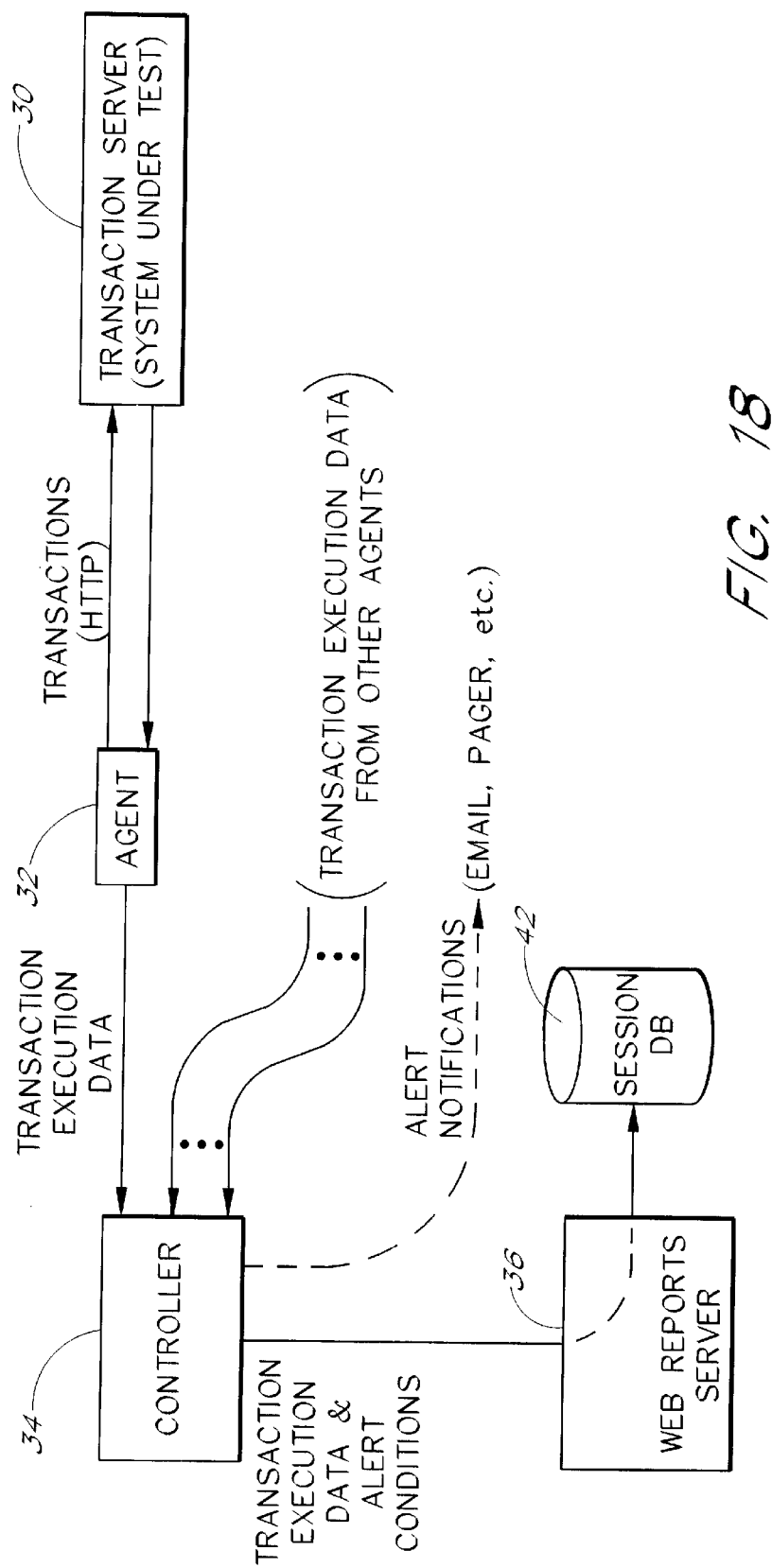

FIG. 18 illustrates the flow of data for a representative, remote agent 32 as the agent executes a testcase. During the execution process, the agent 32 interacts with (e.g., sends HTTP Post and Get messages to) the transactional server 30 while monitoring one or more predefined performance parameters such as response time. The agent 32 also checks any verification points (e.g., expected values or text strings) defined within the testcase. Upon completing each transaction, the agent 32 sends the resulting transaction execution data to the controller 34 using HTTP or another TCP/IP based protocol. The transaction execution data preferably includes a transaction ID, the performance data (response time and pass/fail status) for the transaction, a transaction time/date stamp, and the host ID of the agent computer 40. The agents could alternatively be designed to report their execution on a more or less frequent basis (e.g., once per server response, or once per testcase execution). The controller 34 compares the performance data to any predefined alert conditions. If an alert condition is satisfied for which a notification message has been defined, the controller sends an alert notification message (represented by a dashed line in FIG. 18) to the appropriate entity. Upon receiving an alert notification message, the recipient can log into the reports server 36 to obtain details of the alert event, such as the location or organization of the agent computer that reported associated performance data. The alert events could also be stored locally to the controller computer and displayed within the session tree 46.

As further depicted by FIG. 18, the controller 34 forwards the transaction execution data and any satisfied alert conditions to the web reports server 36 (preferably using the HTTP protocol) for insertion into the sessions database 42. As with the agent-to-controller communications, the controller preferably forwards the transaction execution data to the reports server 36 substantially in real-time, on a transaction-by-transaction basis. This is accomplished in the preferred embodiment through an API of the automation interface 34C (FIG. 1). The alert events are detected and reported to the reports server 36 in real-time by the alerts engine 34D. If multiple agents 32 are scheduled to execute testcases concurrently, the controller 34 processes the data streams from the multiple agents concurrently. The main controller loop is thus in the form of:

wait for message from a Vuser (agent)
    route message to web reports server via API call
        ApmApi_reportTransaction(transaction, host, status, value)
    route message to alarms engine
    go back to wait Various alternatives to the data flow process shown in FIG. 18 are possible. For example, the agents 32 could send the transaction execution data directly to the reports server 36, in which case the reports server 30 could optionally forward some or all of the execution data (e.g., alert conditions only) to the controller 34. In addition, all agent computers 40 within a given location or organization could be configured to aggregate their performance data for transmission to or retrieval by the controller 34 or the reports server 36. In addition, the task of checking for and notifying users of alert conditions could be performed by the agents 32 and/or by the reports server 30, rather than by the controller 34. Further, the agents 32 could be configured to "filter" the transaction execution data, so that only those transactions that meet certain predefined criteria are reported. These and other alternatives could optionally be provided as user-configurable options.

Figure 19:
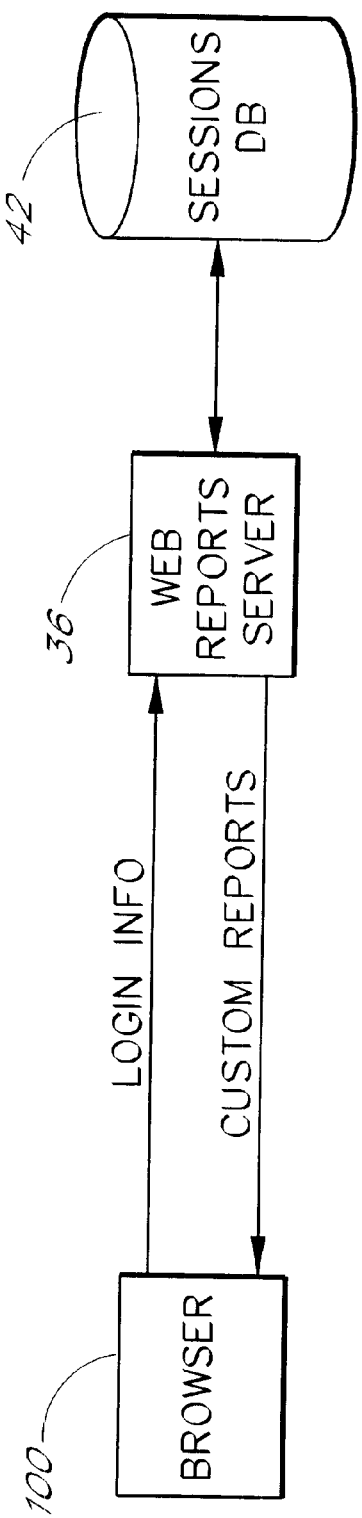

FIG. 19 illustrates the process of remotely accessing the sessions database 42 using a standard web browser 100. As illustrated, the user initially logs into his or her account using a username/password combination or other authentication method. Thereafter, the user views customized, real-time status reports (as described above) for the transaction server or servers corresponding to that account. As the reports pages are requested, the database 42 is accessed and the various performance metrics calculated using programming methods that are well known by those skilled in the art.

VII. Additional Features for Detecting and Reporting Problems

Three optional features for detecting and reporting error conditions and performance problems will now be described. All three of these features are preferably implemented in part through executable code of the agent component 32.

The first such feature involves having the agent computers 40 capture the screens returned by the transactional server 30 during transaction execution, and then forward these screen captures to the reports server 36 if the transaction is unsuccessful. When the end user drills down on a failed transaction within a report, the reports server 36 displays, or presents an option to display, the captured sequence of screen displays for the failed transaction. For example, if the failed transaction involved an unexpected or missing message on a web page, the user could view the entire web page as well as the web pages (including any form data submitted by the agent) that preceded the unexpected response. An important benefit of this feature is the ability for the user to view the sequence of events that led to the failed transaction.

Figure 20:
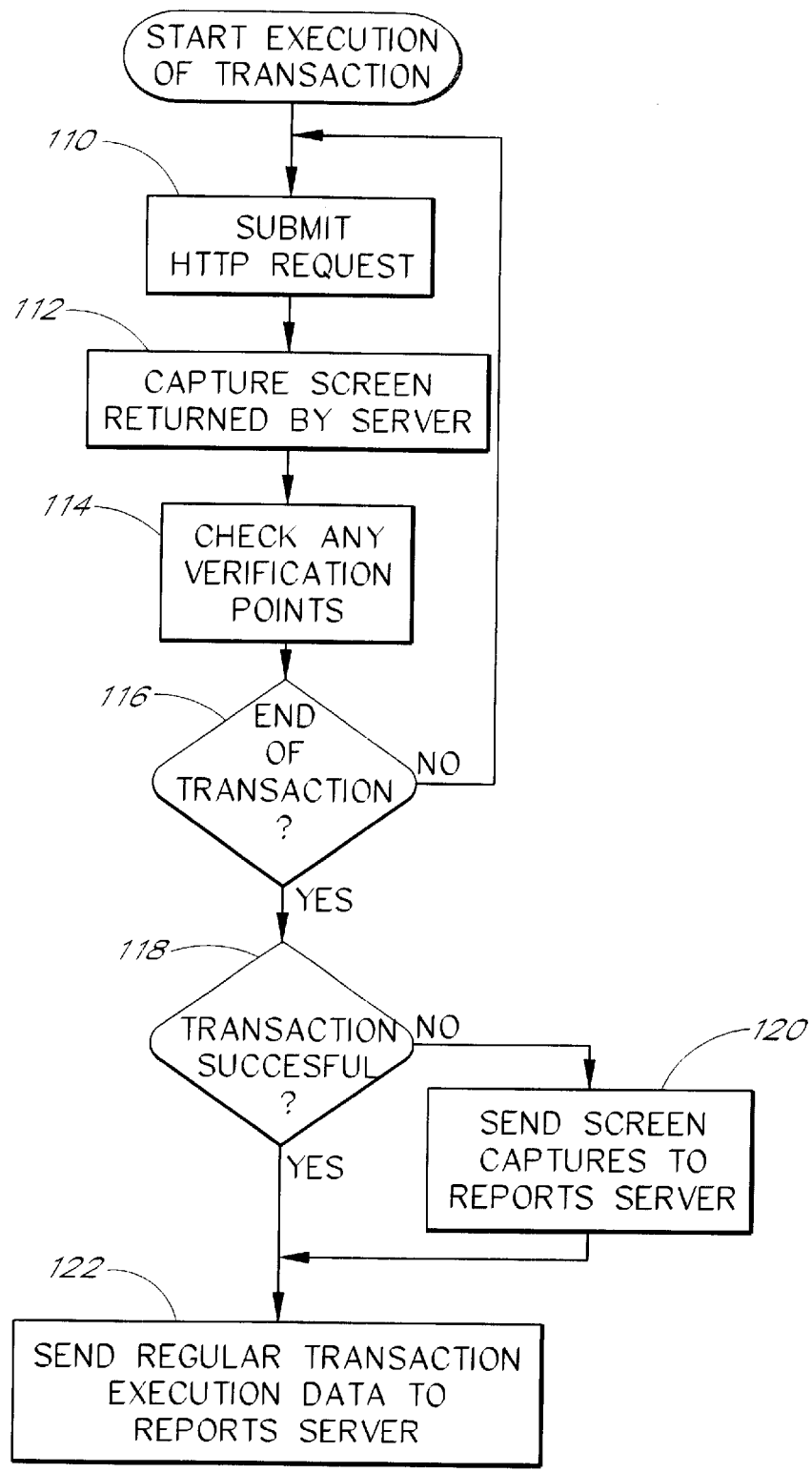
FIG. 20 illustrates a process for capturing screen displays on failed transactions.

FIG. 20 illustrates the screen capture process as implemented within the agent component 32. As depicted by blocks 110–116, each time the agent 32 submits a request to the transactional server 30, the agent captures the screen returned by the transactional server and compares this response against any associated verification points defined within the transaction. The screen displays are preferably stored as bitmap images, but may alternatively be stored in another format such as HTML documents and associated objects.

Once the transaction is finished, the agent 32 determines whether the transaction completed successfully. A transaction is preferably treated as unsuccessful if any verification point failed. A transaction may also be treated as unsuccessful if, for example, a timeout event occurred. In the event of a transaction failure, the agent 32 sends the sequence of captured screen displays to the reports server 36 (block 120), which in turn stores the screen displays in the sessions database 42 for later viewing. The screen displays could additionally or alternatively be sent by email to a human operator for viewing. If the transaction completes successfully, the screen displays are discarded without being forwarded to the reports server 36.

A second feature that may be incorporated into the agent 32 is an ability to measure and report segment delays incurred along a network path between an agent computer 40 and the transactional server 30. The segment delays are preferably measured using the Network Monitor component of the commercially-available LoadRunner 6.0 product of Mercury Interactive Corporation. Preferably, some or all of the agents 32 are configured via the controller 34 to launch the Network Monitor (on their respective agent computers 40) when the path delay exceeds a preprogrammed threshold. These thresholds may optionally be specified by the user when setting up a monitoring session. Upon being launched, the Network Monitor measures the delay along each segment of the path between the relevant agent computer 40 and the transactional server 30 using well-known methods. The agent 32 then reports these measurements to the reports server 36, which allows the user to drill down and view the measurements. The measured delays are preferably presented using the standard segment delay and path delay graphs provided within LoadRunner 6.0. The segment delay data may be used, for example, to detect router problems or bottlenecks in network architectures.

A third feature involves the ability of the agents 32 to detect and report "broken links" (links to inaccessible files or other objects) within web sites. Using this feature, the user can remotely program one or more of the agent computers 40 to crawl the web site periodically (e.g., once per day) to check for broken links, and to report any broken links that are found. When broken links are located, a list of the broken links may automatically be posted to the reports server 36 for viewing and/or be sent to the user by email. Each broken link may be reported to the user in the form of a URL pair that indicates the respective locations of the missing object and the page containing the broken link. Techniques for crawling web sites and checking for broken links are well known in the art, and are described, for example, in U.S. Pat. No. 5,958,008 of Mercury Interactive Corporation. As with other types of problems detected by the agents 32, when a particular object is accessible from some agent computers 40 but not others, the reports server 40 preferably allows the user to separately view the attributes of the agent computers that experienced the problem.

Although the invention has been described in terms of certain preferred embodiments, other embodiments that are apparent to those of ordinary skill in the art, including embodiments which do not provide all of the features and advantages set forth herein, are also within the scope of this invention. Accordingly, the scope of the invention is defined by the claims that follow. In the method claims, reference characters are used for convenience of description only, and do not indicate a particular order for performing the method.

What is claimed is:

1. A method for monitoring the performance of a deployed transactional server, comprising the steps of:
    (a) programming a plurality of computers to execute transactions on the deployed transactional server as simulated users while monitoring performance of the transactional server;
    (b) assigning attributes to the plurality of computers such that at least some of the computers have different attributes than others;
    (c) receiving and storing performance data generated by the plurality of computers as a result of step (a), the performance data indicating at least one parameter of the performance of the transactional server; and
    (d) displaying the performance data separately for each of multiple attributes assigned in step (b).

2. The method as in claim 1, wherein step (d) comprises generating a report which separately indicates the performance of the transactional server as monitored from each of multiple geographic locations.

3. The method as in claim 1, wherein step (d) comprises generating a report which separately indicates the performance as monitored from each multiple organizations.

4. The method as in claim 1, wherein step (d) comprises generating a report which separately indicates the performance as monitored through each of multiple Internet service providers.

5. The method as in claim 1, wherein step (a) comprises assigning automated execution schedules to the plurality of computers, wherein the execution schedules specify timing for executing the transactions.

6. The method as in claim 1, wherein step (a) comprises programming at least some of the plurality of computers to verify user-selected content of responses from the transactional server.

7. The method as in claim 1, wherein step (a) comprises programming at least some of the plurality of computers remotely using a controller program that dispatches testcases to the computers.

8. The method as in claim 7, wherein the controller program is hosted on a server as a web-based service.

9. The method as in claim 1, further comprising generating and transmitting an alert message when the performance data satisfies an alert condition.

10. The method as in claim 9, wherein the alert condition is specific to an attribute-specific subset of the plurality of computers.

11. The method as in claim 1, wherein step (c) comprises receiving and storing the performance data substantially in real time as transactions are executed.

12. The method as in claim 1, further comprising programming the transactional server to process a destructive transaction executed by the one or more of the plurality of computers non-destructively.

13. The method as in claim 1, wherein at least some of the plurality of computers are computers used by end users of the transactional server.

14. The method as in claim 1, wherein the performance data comprises a sequence of screen displays returned by the transactional server during a failed transaction.

15. The method as in claim 1, wherein the performance data comprises network segment delays measured by one or more of the plurality of computers.

16. The method as in claim 1, wherein the performance data comprises identifiers of broken web site links detected by one or more of the plurality of computers.

17. A computer-readable medium having a controller program stored thereon which, when executed by a computer, provides functions for at least:
    selecting a plurality of computers to include within a monitoring session for monitoring the post-deployment operation of a transactional server;
    assigning transactions to the plurality of computers for exercising and monitoring the transactional server; and
    assigning attributes to specific computers of the plurality of computers to permit monitoring of the transactional server separately for each of a plurality of attributes.

18. The computer-readable medium as in claim 17, wherein the attributes include names of organizations in which the computers are located.

19. The computer-readable medium as in claim 17, wherein the attributes include names of geographic regions in which the computers are located.

20. The computer-readable medium as in claim 17, wherein the attributes include at least one of (a) Internet Service Providers used by the computers, and (b) routers to which the computers are coupled.

21. The computer-readable medium as in claim 17, wherein the attributes include configurations of the computers.

22. The computer-readable medium as in claim 17, wherein the controller program provides an option to assign different transactions to different computers of the plurality.

23. The computer-readable medium as in claim 17, wherein the controller program provides a function for assigning execution schedules to the plurality of computers for executing the transactions.

24. The computer-readable medium as in claim 23, wherein the controller program provides an option for the user to define the execution schedules.

25. The computer-readable medium as in claim 17, wherein the controller program graphically represents the monitoring session to the user as a tree in which the transactions are represented as children of corresponding computers.

26. The computer-readable medium as in claim 25, wherein the controller program further represents execution schedules that are assigned to the computers as respective children in the tree.

27. The computer-readable medium as in claim 17, in combination with a report server component that uses the assigned attributes to separate transactional server performance data for display.

28. The computer-readable medium as in claim 17, in combination with an agent component which is adapted to be installed on the plurality of computers to permit the computers to be remotely programmed by the controller program.

29. The computer-readable medium as in claim 17, wherein the controller program provides a user option to specify an alert condition.

30. The computer-readable medium as in claim 29, wherein the controller program provides an option to define an alert condition that is specific to a subset of the plurality of attributes.

31. The computer-readable medium as in claim 17, wherein the controller program implements functions for dispatching the transactions to the plurality of computers.

32. The computer-readable medium as in claim 17, wherein the controller program includes functions for recording the transactions.

33. The computer-readable medium as in claim 17, wherein the controller program includes functions for the user to specify expected responses from the transactional server.

34. A method for monitoring a deployed transactional server, comprising:
    remotely programming a group of computers to access the deployed transactional server as simulated users while monitoring performance of the transactional server such that the transactional server is monitored substantially continuously by the group;
    monitoring performance data generated by the group substantially in real-time to check for an alert condition; and
    generating an alert notification message in response to detection of the alert condition.

35. The method as in claim 34, wherein the alert condition is specific to an attribute-based subset of computers of the group.

36. The method as in claim 34, further comprising storing the performance data in a database substantially in real-time, and providing remote, online access to the database.

37. The method as in claim 36, wherein providing online access comprises providing a user option to specify a timeframe over which to view the performance data.

38. The method as in claim 34, wherein the group includes computers of end-users of the transactional server.

39. A method of monitoring the operation of a transactional server, comprising:
    installing an agent component on a plurality of computers, including computers of end users of the transactional server, wherein the agent component is adapted to execute transactions as simulated users of the transactional server while monitoring performance of the transactional server; and
    remotely assigning to the plurality of computers the transactions to be executed by the agent components installed thereon.

40. The method as in claim 39, wherein assigning the transactions comprises selecting, on a computer-by-computer basis, the transactions to be assigned to each of the plurality of computers.

41. The method as in claim 40, further comprising remotely assigning execution schedules to the plurality of computers for executing the transactions.

42. The method as in claim 41, wherein assigning the execution schedules comprises specifying, on a computer-by-computer basis, the execution schedule to be used by each of the plurality of computers.

43. The method as in claim 39, further comprising aggregating and providing remote access to performance data collected by the plurality of computers, the performance data indicating performance of the transactional server.

44. The method as in claim 43, wherein the performance data includes a sequence of screen displays captured by at least one of the plurality of computers during execution of a transaction.

45. The method as in claim 43, wherein the performance data includes network path segment delays measured by at least one of the plurality of computers.

46. The method as in claim 43, wherein the performance data includes identifiers of broken web site links detected by at least one of the plurality of computers.

47. A method of monitoring operation of a transactional server, comprising, on each of a plurality of computers that are programmed to monitor the transactional server as simulated users:

executing a transaction as a simulated user of the transactional server;

during transaction execution, storing a sequence of screens displays returned by the transactional server;

determining whether the transaction completed successfully; and if the transaction did not complete successfully, forwarding the sequence of screen displays to a server for subsequent viewing.

\* \* \* \* \*